(12) United States Patent
Masurekar et al.

(10) Patent No.: US 9,582,308 B2
(45) Date of Patent: Feb. 28, 2017

(54) AUTO DETECTING LEGITIMATE IP ADDRESSES USING SPOOFGUARD AGENTS

(71) Applicant: Nicira, Inc., Palo Alto, CA (US)

(72) Inventors: Uday Masurekar, Sunnyvale, CA (US); Aravind Srinivasan, Coimbatore (IN)

(73) Assignee: NICIRA, INC., Palo Alto, CA (US)

( * ) Notice: Subject to any disclaimer, the term of this patent is extended or adjusted under 35 U.S.C. 154(b) by 144 days.

(21) Appl. No.: 14/230,473

(22) Filed: Mar. 31, 2014

(65) Prior Publication Data
US 2015/0281274 A1 Oct. 1, 2015

(51) Int. Cl.
G06F 9/455 (2006.01)
H04L 29/06 (2006.01)

(52) U.S. Cl.
CPC ...... *G06F 9/45558* (2013.01); *H04L 63/1466* (2013.01); *G06F 2009/45595* (2013.01)

(58) Field of Classification Search
CPC . H04L 61/103; H04L 61/6004; H04L 45/586; H04L 43/00; H04L 63/1466; G06F 9/45558; G06F 2009/45595
USPC .......................................................... 726/22
See application file for complete search history.

(56) References Cited

U.S. PATENT DOCUMENTS

| | | | |
|---|---|---|---|
| 7,349,382 B2 | 3/2008 | Marimuthu et al. | |
| 7,808,929 B2 | 10/2010 | Wong et al. | |
| 7,818,452 B2 | 10/2010 | Matthews et al. | |
| 7,948,986 B1 | 5/2011 | Ghosh et al. | |
| 8,190,767 B1 | 5/2012 | Maufer et al. | |
| 8,300,532 B1 | 10/2012 | Venkatramani et al. | |
| 2003/0093481 A1 | 5/2003 | Mitchell et al. | |
| 2007/0061492 A1 | 3/2007 | van Riel | |
| 2007/0192862 A1 | 8/2007 | Vermeulen et al. | |

(Continued)

FOREIGN PATENT DOCUMENTS

| | | |
|---|---|---|
| WO | WO 2005/112390 | 11/2005 |
| WO | WO 2008/095010 | 8/2008 |

OTHER PUBLICATIONS

Stackoverflow: How to confirm datagram packet source address? http://stackoverflow.com/questions/19580557/how-to-confirm-datagram-packet-source-address Query by Stackoverflow community member user "geg" Oct. 25, 2013.*

(Continued)

*Primary Examiner* — Kambiz Zand
*Assistant Examiner* — Benjamin Kaplan
(74) *Attorney, Agent, or Firm* — Adeli LLP

(57) ABSTRACT

A method of blocking spoofed packets. The method receives an address allocation message from an address provisioning server that provisions addresses for virtual machines. The address allocation message includes a source address. The method stores the source address of the address allocation message. The method forwards the address allocation message to a virtual machine. The method receives, from the virtual machine, a packet with a second source address. When the second source address is the same as the first source address, the method allows the packet to be forwarded. When the second source address is not the same as the first source address, the method blocks the second packet. An additional method determines the first source address from an initial packet sent from the virtual machine instead of the address allocation method.

20 Claims, 14 Drawing Sheets

(56) References Cited

U.S. PATENT DOCUMENTS

| | | |
|---|---|---|
| 2007/0271362 A1 | 11/2007 | Bamnolker |
| 2008/0072305 A1 | 3/2008 | Casado et al. |
| 2008/0163207 A1 | 7/2008 | Reumann et al. |
| 2009/0129271 A1 | 5/2009 | Ramankutty et al. |
| 2009/0235325 A1 | 9/2009 | Dimitrakos et al. |
| 2009/0249473 A1 | 10/2009 | Cohn |
| 2009/0296726 A1 | 12/2009 | Snively et al. |
| 2010/0115101 A1 | 5/2010 | Lain et al. |
| 2012/0257629 A1 | 10/2012 | Ramakrishnan et al. |
| 2013/0073743 A1 | 3/2013 | Ramasamy et al. |
| 2013/0094376 A1* | 4/2013 | Reeves ............ H04L 43/18 370/252 |
| 2013/0227550 A1 | 8/2013 | Weinstein et al. |
| 2013/0332983 A1 | 12/2013 | Koorevaar et al. |
| 2014/0068602 A1 | 3/2014 | Gember et al. |
| 2014/0115578 A1 | 4/2014 | Cooper et al. |
| 2015/0172103 A1* | 6/2015 | DeCusatis .......... H04L 41/0686 370/389 |

OTHER PUBLICATIONS

Author Unknown, "Enabling Service Chaining on Cisco Nexus 1000V Series," Sep. 2012, 25 pages, CISCO.
Casado, Martin, et al., "SANE: A Protection Architecture for Enterprise Networks," Proceedings of the 15$^{th}$ USENIX Security Symposium, Jul. 31, 2006, pp. 137-151.
Guichard, J., et al., "Network Service Chaining Problem Statement," Network Working Group, Jun. 13, 2013, 14 pages, Cisco Systems, Inc.
Joseph, Dilip, et al., "A Policy-aware Switching Layer for Date Centers," Jun. 24, 2008, 26 pages, Electrical Engineering and Computer Sciences, University of California, Berkeley, CA, USA.
Kohler, Eddie, et al., "The Click Modular Router," ACM Trans. On Computer Systems, Aug. 2000, pp. 1-34, vol. 18, No. 3.
Sekar, Vyas, et al., "Design and Implementation of a Consolidated Middlebox Architecture," 9$^{th}$ USENIX conference on Networked System Design and Implementation, Apr. 25-27, 2012, 14 pages.
Sherry, Justine, et al., "Making Middleboxes Someone Else's Problem: Network Processing as a Cloud Service," SSIGCOMM, Aug. 13-17, 2012, 12 pages, ACM, Helsinki, Finland.

* cited by examiner

US 9,582,308 B2

AUTO DETECTING LEGITIMATE IP ADDRESSES USING SPOOFGUARD AGENTS

BACKGROUND

Many current public (i.e., multi-tenant) datacenters and private (i.e., single-tenant) enterprises implement virtual machines on host machines of the datacenters or enterprises. In a public datacenter, there is a risk that a tenant of the datacenter will attempt to use the virtual machines for illicit purposes that include IP (Internet Protocol) address spoofing. Similarly, on a private enterprise, there is a risk that a virus or other type of malware will infect the virtual machines and attempt to use the infected virtual machines for illicit purposes that include IP address spoofing.

An IP packet includes multiple fields. Packets are generally sent through multiple intermediate network elements between their original source system and their destination system. Accordingly, the fields of the packets include a source IP field and a destination IP field. The destination IP field identifies the intended recipient of the packet and therefore allows intermediate network elements to forward the packet toward its intended recipient system. The source IP address allows the recipient system to identify the original source of the packet and thus address reply packets to the correct system.

IP address spoofing is the creation of Internet Protocol (IP) packets with a counterfeit source IP address (i.e., a source IP address that does not accurately identify the origination of the packet). Packets with counterfeit source IP addresses are sometimes referred to as "spoofed IP packets". Spoofed IP packets disrupt packet forwarding systems because the network sends the reply packets either to a system that is not expecting the reply packets, or to an address that is not the address of any actual system. Spoofed IP packets are often used for illicit activities such as distributed denial of service attacks by botnets, or any other activity where the sender of the packet is not concerned with getting a reply from the receiver of the packet.

BRIEF SUMMARY

Some embodiments of the invention provide a method of preventing IP spoofing by virtual machines implemented on public (i.e., multi-tenant) datacenters or private (i.e., single-tenant) enterprises with multiple hosts. Each host in some embodiments executes one or more virtual machines (VMs). In some embodiments, a proxy operates on each host between each VM and the underlying network. For instance, in some embodiments, a VM's proxy operates between the VM and a physical forwarding element executing on the VM's host. In some embodiments, the physical forwarding elements are software forwarding elements that execute on the host devices to collectively implement different logical forwarding elements (e.g., logical switches, logical routers, etc.) for different logical networks of different tenants, users, departments, etc. that use the same shared computing and networking resources.

In some embodiments, a spoofguard agent implemented on a host machine inspects each outgoing IP packet from the virtual machines of that host machine to determine whether the source IP address of the packet matches a source IP address previously identified by the spoofguard agent as a legitimate IP address of the virtual machine. In some embodiments, a proxy forwards packets or parts of packets (i.e., some, but not all fields of the packets) to the spoofguard agent. In some embodiments, the proxies are implemented as part of virtual network interface cards (VNICs) of the virtual machines. In other embodiments, the proxies are implemented as part of the ports of a physical forwarding element. In still other embodiments, the proxies are implemented as a separate layer between the virtual machines and the physical forwarding element.

In order to determine the legitimate IP addresses of the virtual machines on the host machine, the spoofguard agent of some embodiments performs various different actions depending on the provisioning method of the IP addresses. In some embodiments, the spoofguard agent allows virtual machines to use source IP addresses that are static and provided to spoofguard agent (e.g., in a storage that the spoofguard agent can access). In some embodiments, the spoofguard agent allows virtual machines to use source IP addresses that are static and not provided to the spoofguard agent (e.g., provided to the virtual machines, but not to the spoofguard agent). These embodiments are sometimes referred to as "trust on first use" (TOFU) systems. In some embodiments, a static IP (of either a system in which the IP is provided to the spoofguard agent or a system in which the spoofguard uses trust on first use) cannot be changed unless an administrator with control over the virtual machines commands that the IP should change. In some embodiments, the spoofguard agent allows virtual machines to use source IP addresses that are dynamically allocated (e.g., by a DHCP server or virtual machine performing the functions of a DHCP server). Spoofguard agents that identify legitimate IP addresses of virtual machines by intercepting DHCP packets may also be referred to as "DHCP TOFU" spoofguard systems or simply as "DHCP" spoofguard systems.

When the IP addresses of the virtual machines are static and provided to the spoofguard agent, the spoofguard agent uses the provided IP addresses as legitimate source IP addresses. When the IP addresses of the virtual machines are static and not provided to the spoofguard agent, then the spoofguard agent deduces the legitimate source IP addresses from the first outgoing packet sent from each of the virtual machines. The spoofguard agent then stores the deduced IP address as the legitimate IP address to be used in association with the MAC address of the virtual machine's VNIC. When the IP address of the virtual machines are dynamically assigned (e.g., set by a DHCP server), the spoofguard agent of some embodiments allows a DHCP discover broadcast from the virtual machine, but intercepts the DHCP offer and only allows DHCP offers from known DHCP servers to reach the virtual machine. The spoofguard agent of some embodiments then allows the DHCP request message from the virtual machine to be broadcast and the DHCP acknowledgement message from the DHCP server to reach the virtual machine. The spoofguard agent in some embodiments stores the IP address of the DHCP acknowledgement message in a storage module, as the legitimate IP address to be used in association with the MAC address of the virtual machine's VNIC. In some embodiments, the proxy intercepts the DHCP offer and passes the query or relevant parts of the offer to the spoofguard agent so that the spoofguard agent will determine whether to allow or block the offer.

When the DHCP server replies with an allocation of an IP address for the virtual machine, the spoofguard agent allows the physical forwarding element to forward (or allows the proxy to allow the physical forwarding element to forward) the reply to the virtual machine and stores the assigned IP address as an authorized IP address associated with a MAC address of the VNIC of the virtual machine. After identifying the legitimate source IP address of a virtual machine, the spoofguard agent then blocks any packets with a different source IP address, sent by that virtual machine (e.g., with that MAC address), from being sent on toward their destination IP addresses.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 4 illustrates a spoofguard agent allowing a legitimate IP packet to pass through.

DETAILED DESCRIPTION

Figure 1:
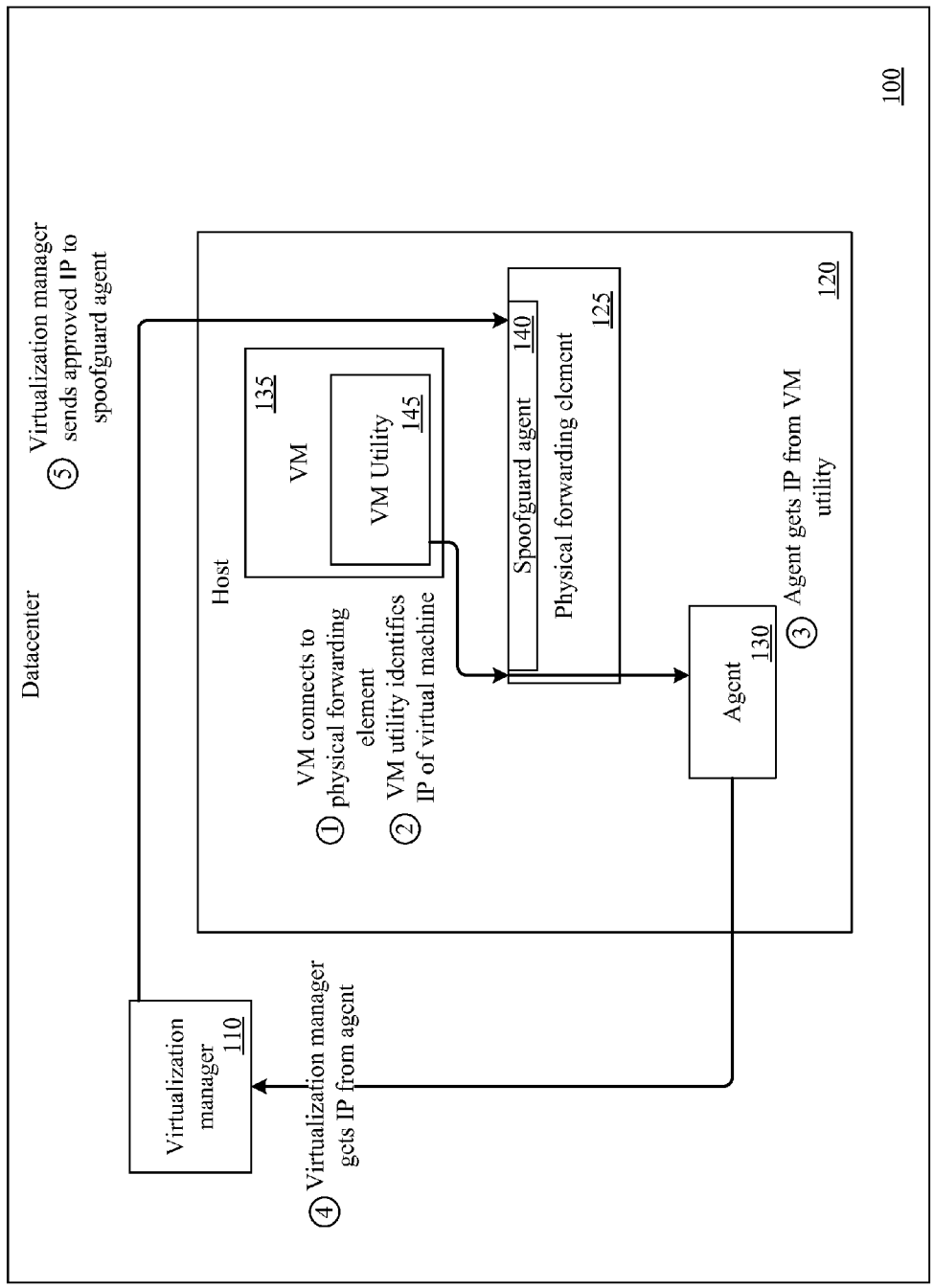
FIG. 1 illustrates an example of a method used in the prior art to provide IP addresses to a spoofguard agent.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of preventing IP spoofing by virtual machines implemented on a public (i.e., multi-tenant) datacenter or private (i.e., single-tenant) enterprise. In some embodiments, a spoofguard agent implemented on a host machine inspects each outgoing IP packet from the virtual machines implemented on the host machine. The spoofguard agent inspects each outgoing packet to determine whether the source IP address of the packet matches a source IP address previously identified by the spoofguard agent as an IP address of one of the virtual machines on the host machine.

In order to determine the legitimate IP addresses of the virtual machines on the host machine, the spoofguard agent of some embodiments performs various different actions depending on the provisioning method of the IP addresses. In some embodiments, when the IP addresses of the virtual machines of a host machine are static and provided directly to the spoofguard agent of the host machine by the system that sets up the virtual machines, the spoofguard agent uses the provided IP addresses as the legitimate IP addresses. When the IP addresses of the virtual machines of a host machine are static and not provided directly to the spoofguard agent, then the spoofguard agent of some embodiments deduces the legitimate source IP addresses from the first outgoing packet sent from each virtual machine. In some embodiments, a static IP (of either a system in which the IP is provided to the spoofguard agent or a system in which the spoofguard uses trust on first use) cannot be changed unless an administrator with control over the virtual machines commands that the IP should change. In some embodiments, when the IP addresses of the virtual machines are dynamic, set by a DHCP server, the spoofguard agent receives the DHCP discover message from a particular virtual machine and allows the discover message to reach the DHCP. In some such embodiments, when the DHCP server replies with a DHCP offer message with a proposed IP address for the virtual machine, the spoofguard agent allows the offer to reach the virtual machine and (once a DHCP request and DHCP acknowledgment are sent and received) stores the assigned IP address of the DHCP acknowledgement as a legitimate IP address of that virtual machine.

The term "packet" is used here as well as throughout this document to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc. In some embodiments, the virtual machines include one or more virtual network interface cards (VNICs). Although the description above refers to IP addresses of virtual machines, in some embodiments, the IP addresses are associated with the VNICs of the virtual machines, rather than the virtual machine itself.

The embodiments of the spoofguard agent described herein provide a new method for a spoofguard agent to determine the legitimate IP addresses of a virtual machine. Before describing the present embodiments, the following example of the prior art is provided for context. FIG. 1 illustrates an example of a method used in the prior art to provide IP addresses to a spoofguard agent. FIG. 1 includes datacenter 100 with virtualization manager 110, and host 120. The host 120 implements a physical forwarding element 125, an agent 130, and a virtual machine 135. In the illustrated example, a spoofguard agent 140 is implemented as part of the physical forwarding element 125. Additionally, a virtual machine utility program 145 is implemented as part of virtual machine 135.

In this prior art example, the virtual machine 135 connects to the physical forwarding element 125. The virtual machine utility program 145 identifies the legitimate IP address from the configuration of the virtual machine 135. The virtual machine utility program 145 sends the identified IP address to the agent 130 through the physical forwarding element 125. The agent 130 then sends the identified IP address to the virtualization manager 110. The virtualization manager 110 then supplies the IP address to the spoofguard agent 140 as the legitimate IP address for that virtual machine. Once the legitimate IP address is supplied to the spoofguard agent 140, the spoofguard agent is able to allow IP packets using that IP address as the source IP address of the packet to pass through the physical forwarding element 125. The spoofguard agent blocks IP packets that use different IP addresses as their source address.

Figure 2:
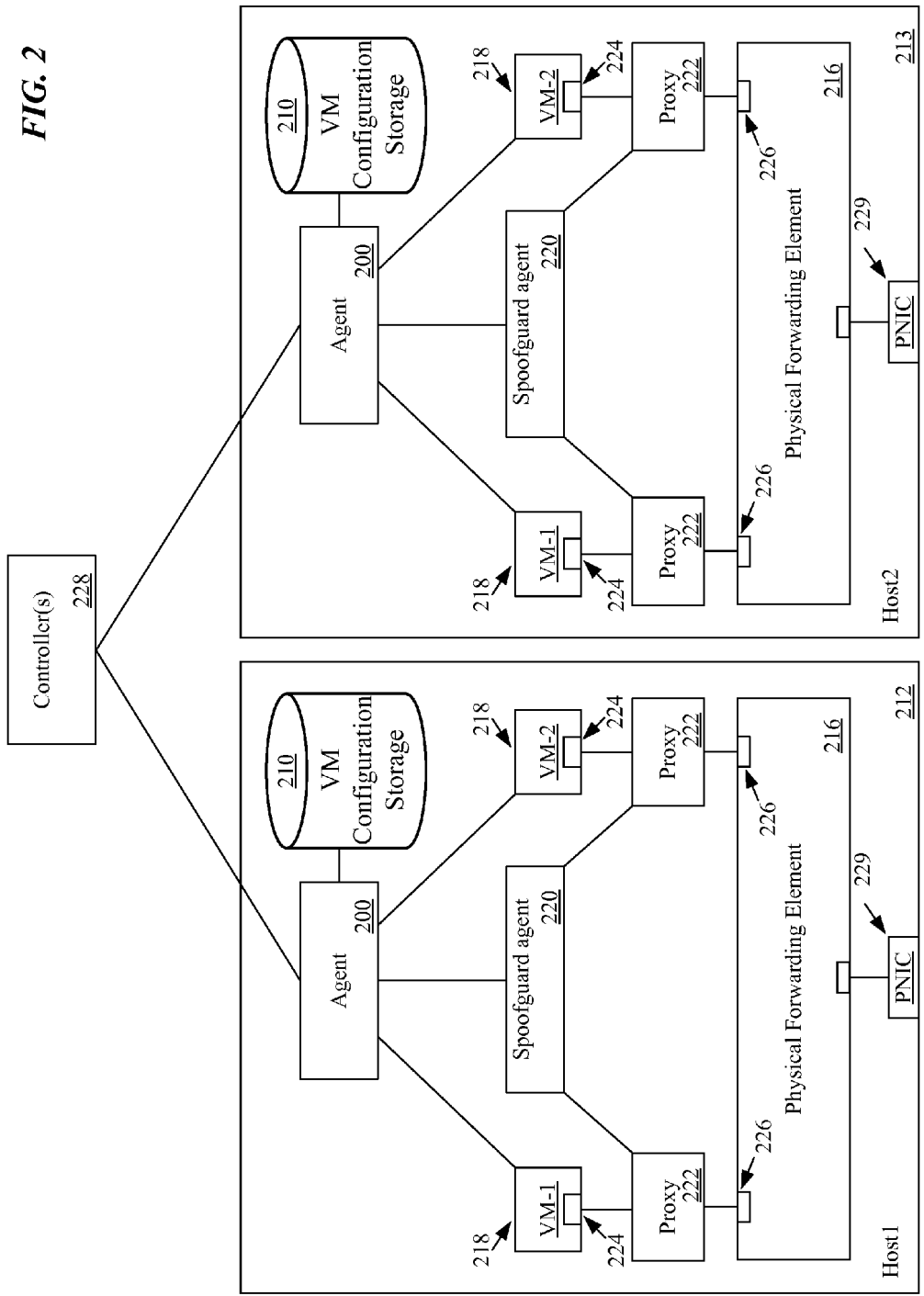
FIG. 2 illustrates an environment within which a spoofguard agent of some embodiments is implemented.

As mentioned above, the present embodiments provide methods for a spoofguard agent to determine the legitimate IP addresses of a virtual machine (in a different manner than the prior art). FIG. 2 illustrates an environment within which a spoofguard agent of some embodiments is implemented. This environment includes host machines (hosts) 212 and 213 controlled by one or more controllers 228 (e.g., controllers of servers of an enterprise or datacenter).

Host machines 212 and 213 are illustrated in detail with hardware structures of the host and software modules implemented by the host. However, some embodiments include additional hardware and/or implement additional software. Also, some embodiments include additional hosts controlled by controller(s) 228. The hosts 212 and 213 are computers that implement agents 200, VM configuration storages 210, physical forwarding elements 216 (e.g., virtual switches or other software forwarding elements), virtual machines 218, spoofguard agents 220, and proxies 222. The hosts 212 and 213 include physical network interface cards (PNICs) 229.

In some embodiments, the controller(s) 228 command the agents 200 to direct the hosts 212 and 213 to implement the virtual machines 218. In some embodiments, configuration data for implementing the virtual machines is stored in VM configuration storage 210. In some embodiments, a single VM configuration storage is used on each host, while in other embodiments, a separate VM configuration storage is used for each virtual machine to simplify movements of virtual machines between hosts (e.g., the VM configuration storage relating to a particular VM is moved from one host to another along with any other data used to implement that virtual machine).

Communications between the virtual machines 218 and the physical forwarding elements 216 are done by virtual network interface cards 224 (VNICs) of the virtual machines 218 and ports 226 of the physical forwarding elements 216 in some embodiments. This figure and later figures herein show the proxies 222 as independent software modules along the data path between the VMs 218 and the physical forwarding elements 216. However, in some embodiments, the proxy is inserted in the datapath between the VNIC and the port not as an independent element, but by including one or more function calls to the proxy in the code that implements the VNIC or the port. Accordingly, in these embodiments, the proxy is a module that is called so that it can obtain a determination by the spoofguard agent of whether a packet should be allowed to pass through or be blocked.

In some embodiments that implement proxies by use of function calls on the ports of the physical forwarding element, the ports of the PFE include one or more function calls to one or more modules that implement special input/output operations on incoming and outgoing packets that are received at the ports. One of these function calls is to the spoofguard agent, which performs, in some embodiments, firewall operations on incoming and/or outgoing packets (i.e., on packets that are received by the host for one of the VMs or on packets that are sent by one of the VMs). Other examples of such I/O operations include ARP broadcast suppression operations and DHCP broadcast suppression operations, as described in U.S. patent application Ser. No. 14/070,360. Other I/O operations can be so implemented in some embodiments of the invention. By implementing a stack of such function calls, the ports can implement a chain of I/O operations on incoming and/or outgoing packets in some embodiments. Also, in some embodiments, other modules in the data path (such as the VNICs, etc.) implement the I/O function call operations (such as the spoofguard agent function calls).

In some embodiments, agents (e.g., proxy agent 220 and/or other agents (not shown)) execute in the user space, while the proxies 222 execute in the kernel space. In some of these embodiments, the agents and proxies communicate through a type of socket (e.g., a vmklink of VMware) that establishes a communication control channel.

In each host 212 and 213, traffic between the virtual machines 218 and the physical forwarding element 216 is passed from the proxy 222 to the spoofguard agent 220 to be inspected by the spoofguard agent 220 before being allowed to pass through the physical forwarding element 216, in some embodiments. The physical forwarding element 216 then passes traffic between virtual machines 218 and other systems (e.g., other virtual machines on the private network, outside machines, etc.). The hosts 212 and 213 connect through physical network interface cards (PNIC) 229 to a network (not shown). In some embodiments, the network is an internal network of an enterprise or a datacenter. In some embodiments, such a network is communicatively connected to other systems (e.g., hosts, other machines, etc.) within or outside of the enterprise or datacenter.

In each host 212 and 213, the proxies 222 monitor the traffic of the VMs 218, and intercept IP and broadcast packets. The proxies 222 connect (e.g., through an agent such as spoofguard agent 220 or other agents, not shown) to a set of one or more controllers 228 that collect and maintain global information of the network. By connecting to the controller(s) 228, the proxies 222 can obtain information that they can use to resolve broadcast requests and/or identify the virtual machines in the network from which particular IP packets are coming. In some embodiments, the connections between the proxies and the controller(s) are encrypted and authenticated, to enhance the security. As illustrated in this figure, in some embodiments, the connections between the proxies 222 and the controller(s) 228 are indirect connections through the spoofguard agent 220 and/or agent 200. That is, in some embodiments, the proxies connect through the spoofguard agent 220 and/or another agent 200 (e.g., an agent 200 that configure VMs 218) that execute on each host device and connect the proxies 222 of each host device with the controller(s) 228. In other embodiments, the proxies connect directly to the controller(s).

As shown in FIG. 2, the host machines 212 and 213 host multiple virtual machines 218. In some cases, the virtual machines 218 belonging to a single tenant (e.g., implementing virtual machines on hosts of an enterprise). In other cases, the hosts 212 and 213 are hosts of a public datacenter with the virtual machines 218 belonging to multiple tenants.

While this figure illustrates two hosts 212 and 213, one of ordinary skill in the art will recognize that the controller(s) of some embodiments might control hundreds or thousands of host machines (e.g., arranged in racks). One of ordinary skill will also recognize that the PNICs 229 may connect to a network that includes one or more gateways or other forwarding elements that handle communication within network and/or between the internal network and a an external network (e.g., the Internet).

The above description introduces discussion of methods of some embodiments for preventing IP spoofing. Several more detailed examples are described below. Section I describes a spoofguard agent operating on a host that receives IP addresses directly from controllers that do not supply the IP addresses to a spoofguard agent. Section II describes a spoofguard agent operating on a host that uses IP addresses assigned by DHCP servers. Section III describes configurations for spoofguard agents that use multiple IP identification methods on the same system. Section IV describes an electronic system that implements the methods and programs of some embodiments.

I. Spoofguard Agent with Controller Assigned IPS

Figure 3:
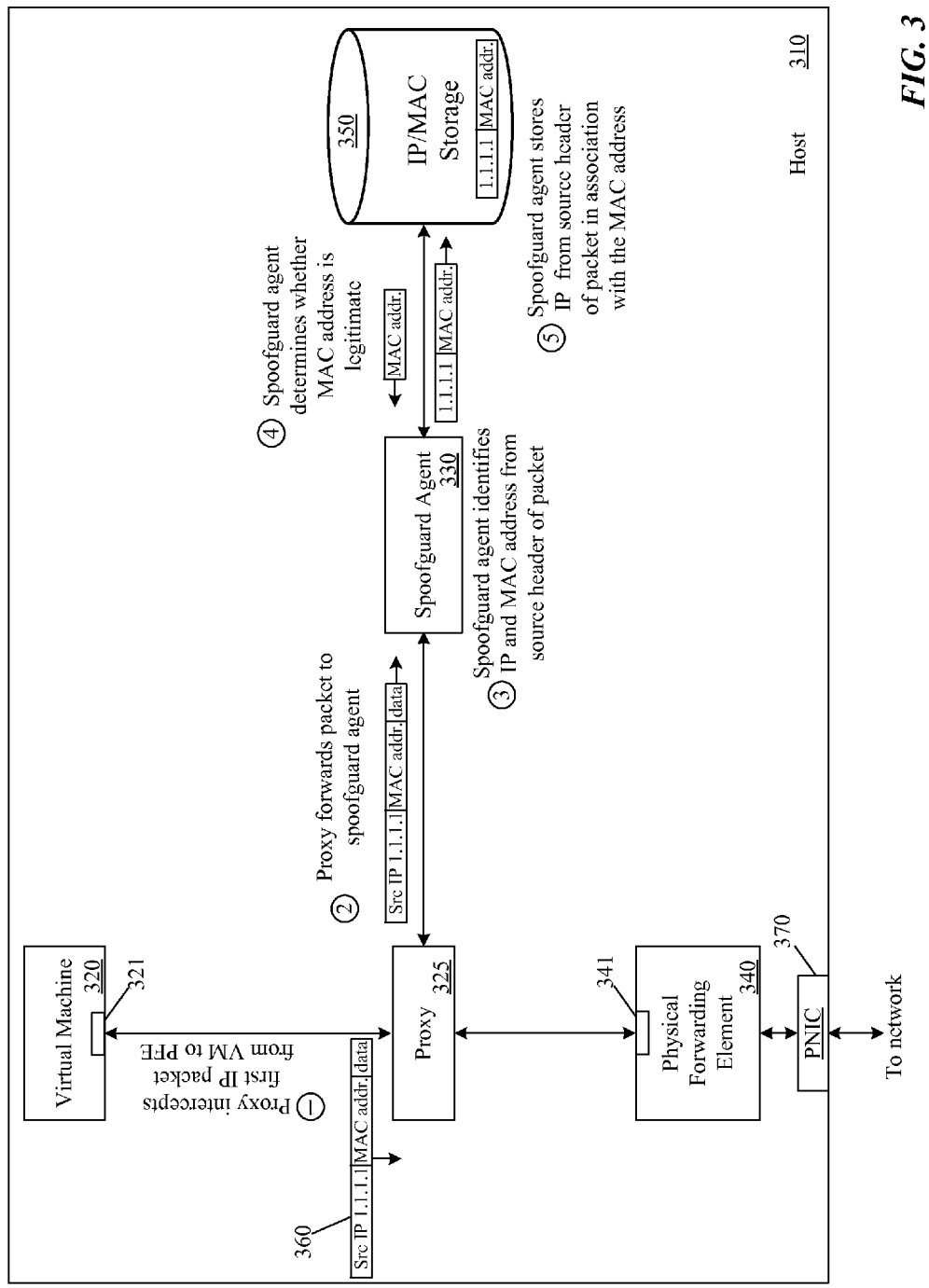
FIG. 3 illustrates the spoofguard agent deducing a source IP address in a static IP system.
Figure 4:
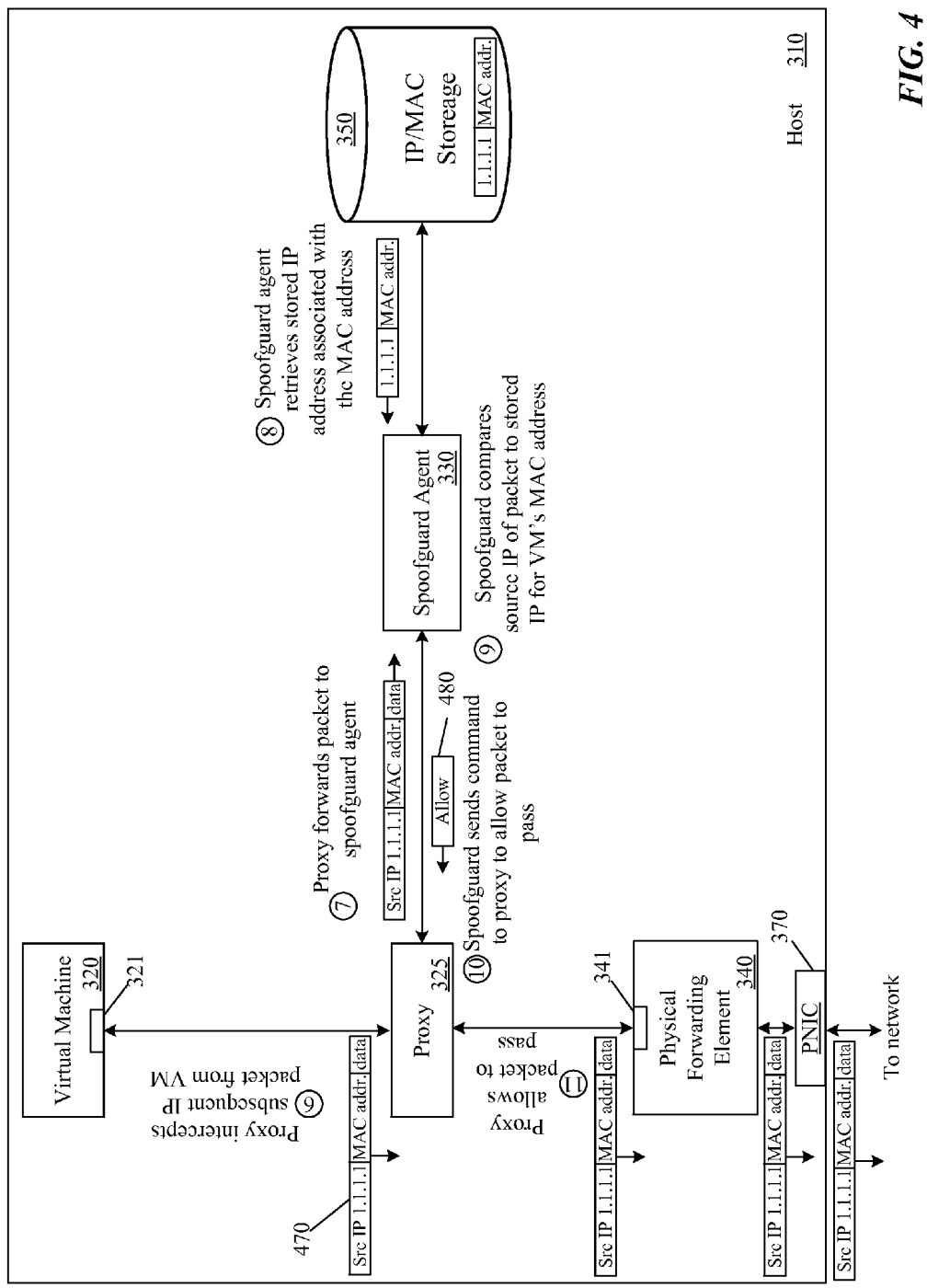
Figure 5:
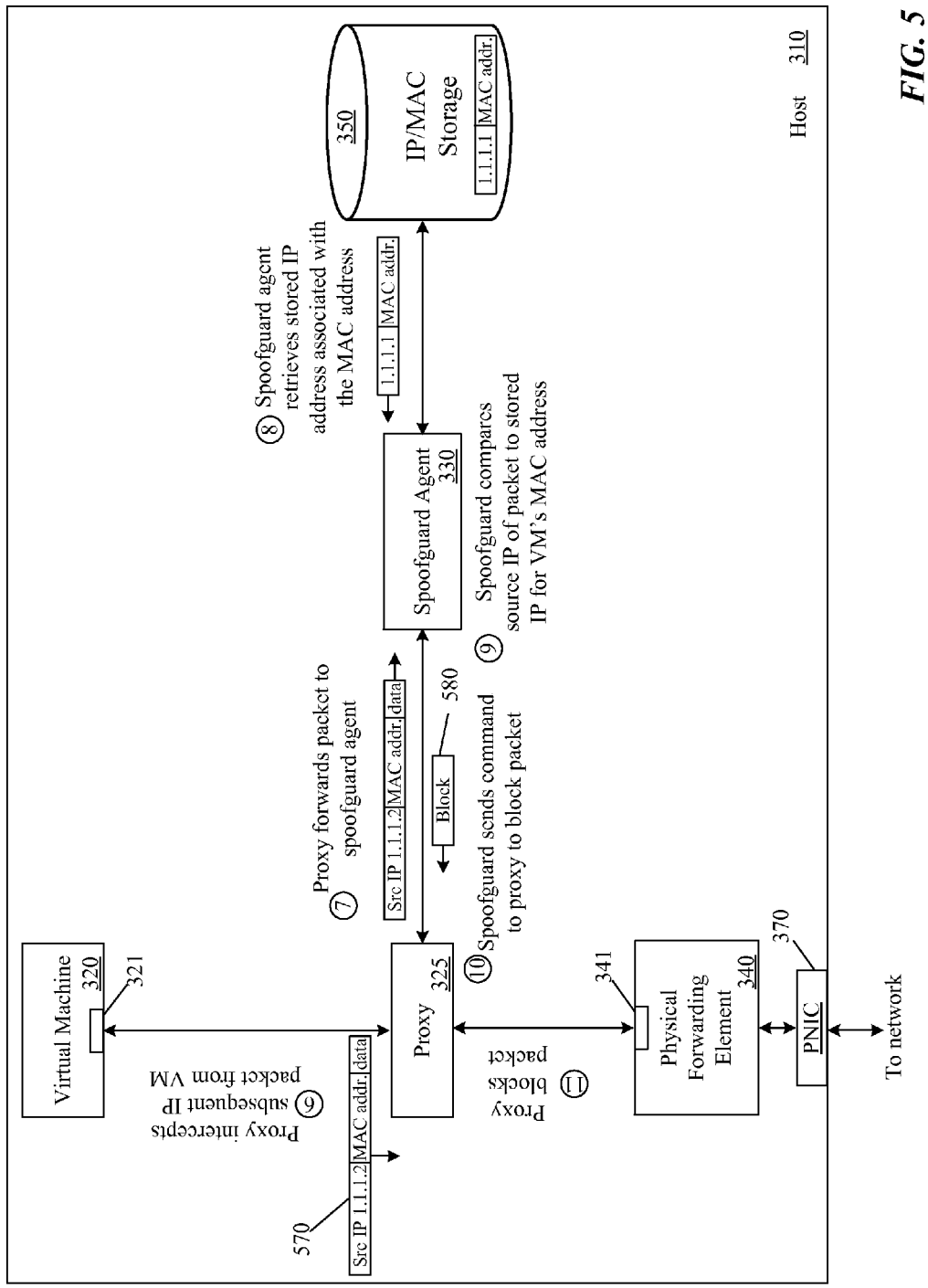
FIG. 5 illustrates a spoofguard agent blocking an illegitimate subsequent packet.

As mentioned above, some embodiments provide methods for identifying legitimate source IP addresses of virtual machines executing on a host machine when the IP addresses are assigned by a controller, but are not directly supplied to a spoofguard agent. In some such embodiments, the spoofguard agents implement "trust on first use" (TOFU) systems. That is, the source IP address of the first packet from a MAC address of a particular virtual machine (or a particular VNIC of a particular virtual machine) is assumed to be the legitimate source IP address associated with that MAC address. FIGS. 3-5 illustrate multiple stages of a system with a spoofguard agent deducing an IP address using a TOFU system, allowing legitimate IP packets to pass through, and blocking spoofed IP packets. FIG. 3 illustrates the spoofguard agent deducing a source IP address in a static IP system. The figure includes a host machine 310. The host machine 310 implements a virtual machine 320, a proxy 325, a spoofguard agent 330, and a physical forwarding element 340. The host machine 310 includes IP/MAC address storage 350 and a PNIC 370.

FIG. 3 shows the host machine 310 after it first implements the virtual machine 320. In some embodiments, when the virtual machine 320 is first implemented by the host machine 310, a controller (not shown) assigns a MAC address (and in some embodiments an IP address) to a VNIC 321 of the virtual machine 320. In some such embodiments, an agent (not shown) receives the configuration information for the virtual machine 320 from the controller and stores the configuration information in VM configuration storage (not shown). In some embodiments, the agent supplies the MAC address to the virtual machine 320 and additionally stores the MAC address in the IP/MAC address storage 350.

In some embodiments, the spoofguard agent 330 identifies legitimate MAC addresses by accessing the IP/MAC address storage 350. In some such embodiments, the spoofguard agent 330 blocks packets with MAC addresses not found in the IP/MAC address storage 350. In some embodiments, a single agent, such as spoofguard agent 330, performs the functions of both the VM configuring agent and the spoofguard agent 330. Similarly, while storage specifically for IP/MAC addresses (IP/MAC address storage 350) is shown in this figure, in some embodiments, a single storage module stores IP and MAC addresses and additionally stores other configuration data for virtual machines on the host. Furthermore, the IP/MAC address storage 350 in some embodiments is one common data store for all the VMs that execute on the host. In other embodiments, each VM has its own separate IP/MAC data store that is uniquely maintained for that VM. Similarly, VM configuration storage (not shown) in some embodiments is a common data store and in other embodiments each VM has separate VM configuration data storage. Maintaining separate data storages for each VM allows the configuration data (e.g., IP configuration data for the spoofguard agent) to easily migrate with the VM when the VM migrates from one host to another host.

In this figure, virtual machine 320 sends a first IP packet 360 from a VNIC 321 of the virtual machine, to a port 341 of the physical forwarding element 340 on the way to PNIC 370 and thereafter to a network (e.g., a network of a datacenter or enterprise of the hosts or an external network). The IP packet 360 includes source IP address data identifying the IP address of the virtual machine 320, here represented by "Src IP 1.1.1.1", a MAC address of the VNIC 321 and additional data (e.g., other fields or payload data). The proxy 325 intercepts the packet 360 and forwards the packet, or in some embodiments parts of the packet (e.g., the source IP and MAC addresses only), to the spoofguard agent 330. In some embodiments, the proxy 325 is implemented as part of the VNIC 321. In other embodiments, the proxy 325 is implemented as part of the port 341 of the physical forwarding element 340. In still other embodiments, the proxy 325 is implemented as a layer between the virtual machine 320 and the physical forwarding element 340.

The spoofguard agent 330 identifies the first packet 360 to be sent from the virtual machine 320 after the virtual machine 320 is implemented by the host machine 310. The spoofguard agent 330 then stores the source IP address of the packet (in this figure, 1.1.1.1) in the storage 350 in association with the MAC address previously stored in the IP/MAC storage 350 (e.g., by a VM configuration agent, not shown). After the deduced legitimate IP address is stored in association with a particular MAC address, the spoofguard agent will block, as described with respect to FIG. 5 below, any packet with that MAC address (i.e., a packet from the virtual machine or VNIC that uses that MAC address) that has a different source IP address from the legitimate stored IP address.

As described above, the first packet 360 sent by a virtual machine after it is implemented is identified by the spoofguard agent 330. In some embodiments, a host implements a virtual machine, deactivates the virtual machine, then optionally re-implements the same virtual machine by using the same configuration data as the previously implemented virtual machine. In some such embodiments, the re-implemented virtual machine uses the same MAC address and the same source IP address as it did when it was first implemented. Accordingly, the spoofguard agent of such embodiments identifies and stores the legitimate IP address (associated with the MAC address of a VNIC of that virtual machine) from the first packet sent after the first ever implementation of the virtual machine, but does not identify or store a new legitimate IP address when the virtual machine is re-implemented after being deactivated. In other embodiments, a host machine can re-implement a virtual machine with the same MAC address, but a different assigned IP address. In such embodiments, the spoofguard agent identifies a new legitimate IP address from the first packet sent after each re-implementation of the virtual machine.

Although the figure shows the IP address and MAC address going from the spoofguard agent 330 to the storage 350, in some embodiments, the spoofguard agent forwards the address to another agent (not shown) and that agent stores the IP address for further use by the spoofguard agent 330, instead of or in addition to the spoofguard agent 330 directly storing the IP and MAC addresses in IP/MAC address storage 350.

In some embodiments, a first set of packets is used to identify the IP address, rather than a single packet. Although it is not shown in FIG. 3, the spoofguard agent 330 of some embodiments sends a command to the proxy 325 to allow the first IP packet 360 (or set of IP packets in some embodiments) to be forwarded by the physical forwarding element 340 to PNIC 370 and through the PNIC 370 to a network (e.g., an internal network of and enterprise or datacenter of the hosts or an external network such as the Internet) after identifying the legitimate source IP address based on the packet.

FIG. 4 illustrates a spoofguard agent allowing a legitimate IP packet to pass through. Many elements of this figure are the same as FIG. 3, but this figure shows how the spoofguard agent handles legitimate packets after the legitimate IP address is deduced. In FIG. 4, the virtual machine 320 sends a subsequent IP packet 470 from the VNIC 321 to the port 341 of the physical forwarding element 340 through the proxy 325. The proxy 325 forwards the packet, or in some embodiments parts of the packet (e.g., the source IP and MAC addresses), to spoofguard agent 330. The spoofguard agent 330 compares the source address of the subsequent packet 470 to the stored source address (associated with the MAC address of the packet) in storage 350. When the source address of the subsequent packet 470 (here 1.1.1.1) matches the stored source address associated with the MAC address of the packet (here, 1.1.1.1), the spoofguard agent 330 sends a command 480 to the proxy 325 to allow the physical forwarding element 340 to forward the subsequent IP packet 470 to the PNIC 370 and through PNIC 370 to a network (e.g., to a network such as an internal network of an enterprise or datacenter of the hosts or an external network such as the Internet).

While FIGS. 3-5 show a single virtual machine on a host for simplicity, in some embodiments each host machine implements multiple virtual machines. In some such embodiments, each of multiple virtual machines includes one or more VNICs, each VNIC having a MAC address and an IP address associated with them. Because there are multiple VNICs, each with a different MAC address and legitimate IP address, the spoofguard agents of some embodiments check each outgoing packet to determine whether the source IP address of the packet matches the legitimate source IP address associated with the MAC address of the packet, rather than merely checking whether the source IP address matches any legitimate source IP address of any virtual machine which has its IP address stored in the IP/MAC storage. That is, a packet with a source IP address that is in the IP/MAC storage, but is associated with a different MAC address than the MAC address of the packet sent from the virtual machine will not be allowed to pass through by the spoofguard agents of some embodiments.

In contrast to FIG. 4, FIG. 5 illustrates a spoofguard agent blocking an illegitimate subsequent packet. Many elements of this figure are the same as FIGS. 3 and 4, but this figure shows how the spoofguard agent handles spoofed packets after the legitimate IP address is deduced. In this figure, the virtual machine 320 sends a spoofed subsequent IP packet 570 from VNIC 321 to the port 341 of physical forwarding element 340, through the proxy 325. The proxy 325 forwards the packet, or in some embodiments parts of the packet (e.g., the source IP and MAC addresses), to spoofguard agent 330. The spoofguard agent 330 compares the source address of the spoofed subsequent packet 570 to the stored source address in storage 350. When the source address of the spoofed subsequent packet 570 (here 1.1.1.2) does not match the stored source address (here, 1.1.1.1), the spoofguard agent 330 sends a command 580 to the proxy 325 to block the physical forwarding element 340 from forwarding the subsequent packet 570 to the PNIC 370.

Figure 6:
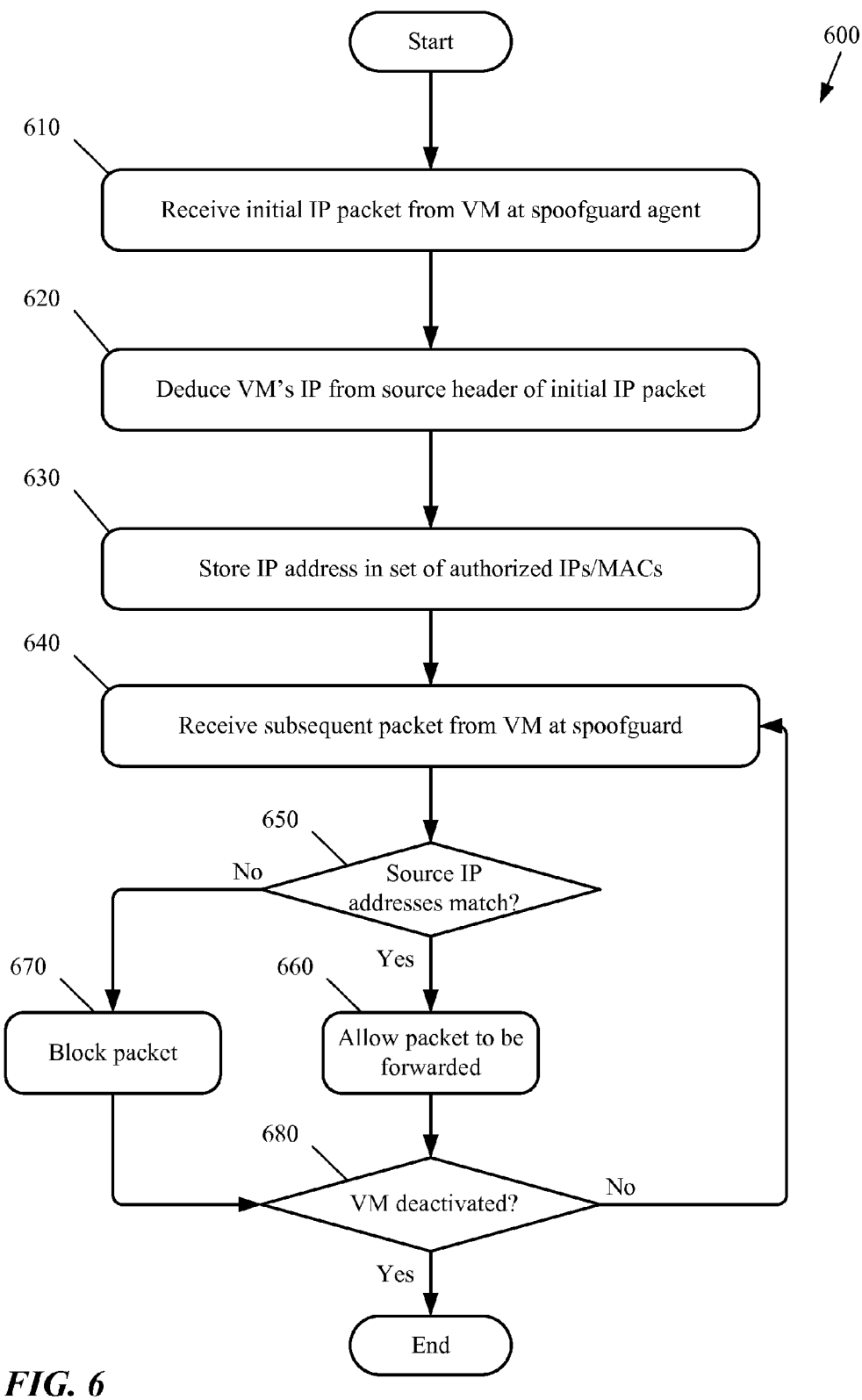
FIG. 6 conceptually illustrates a process of some embodiments for blocking spoofed IP packets and allowing legitimate IP packets in a system with statically allocated IP addresses.

The preceding FIGS. 3-5 illustrate examples where the spoofguard agent allows legitimate IP packets to pass through (FIG. 4) and blocks spoofed IP packets (FIG. 5). The spoofguard agent of some embodiments determines whether to block or allow packets using a process as shown in FIG. 6. FIG. 6 conceptually illustrates a process 600 of some embodiments for blocking spoofed IP packets and allowing legitimate IP packets in a system with statically allocated IP addresses. The process 600 receives (at 610) an initial IP packet from a virtual machine at a spoofguard agent. For example, in FIG. 3, the IP packet 360 is an initial IP packet from virtual machine 320. The process 600 then deduces (at 620) the virtual machine's IP address from a source header of the initial IP packet. The process 600 then stores (at 630) the deduced IP address in a set of authorized IP addresses (e.g., storing the IP address "1.1.1.1" in storage such as storage 350 of FIGS. 3-5).

The process 600 receives (at 640) a subsequent IP packet (or, in some embodiments, relevant parts of the IP packet) from the virtual machine at the spoofguard agent. For example, the subsequent packets 470 and 570 of FIGS. 4 and 5 are received at spoofguard agent 330.

The process 600 then determines (at 650) whether the source address of the subsequent IP packet matches the stored source address associated with that virtual machine. When the source IP addresses of the initial and subsequent IP packets match, the process 600 allows (at 660) the packet to be forwarded by a physical forwarding element of the host machine of the virtual machine. For example, in FIG. 4 the source address of the subsequent packet 470 matches the source address of the initial packet 360 (from FIG. 3), so the spoofguard agent 330 allows the packet to be forwarded by the physical forwarding element 340. The process 600 of some embodiments then determines (at 680) whether the virtual machine has been deactivated. When the virtual machine has been deactivated, the process ends. When the virtual machine has not been deactivated, the process returns to operation 640 to receive another IP packet.

When the source IP addresses of the initial and subsequent IP packets do not match, the process 600 blocks (at 670) the packet from being forwarded by the physical forwarding element of the host machine of the virtual machine. For example, in FIG. 5 the source address (IP address 1.1.1.2) of the subsequent packet 570 does not match the source address (IP address 1.1.1.1) of the initial packet 360 in FIG. 3. Therefore, the spoofguard agent 330 (in FIG. 5) blocks the packet from being forwarded by the physical forwarding element 340. The process 600 of some embodiments then determines (at 680) whether the virtual machine has been deactivated. When the virtual machine has been deactivated, the process ends. When the virtual machine has not been deactivated, the process returns to operation 640 to receive another IP packet.

Although the above described process 600 loops back to operation 640 to receive another IP packet from the virtual machine without taking other actions, in some embodiments, the spoofguard agent sends a report (e.g., to a network administrator) when a virtual machine attempts to send a spoofed packet. In some embodiments, the report is sent after a virtual machine makes a threshold number of attempts to send a spoofed packet.

In the embodiments described with respect to FIGS. 3-5, a controller (not shown) assigns MAC addresses to virtual machines on hosts and those MAC addresses are accessible to the spoofguard agent 330. In the above described embodiments, the IP addresses are supplied to the virtual machines (e.g., by a controller), but not supplied directly to the spoofguard agent 330. However, in some embodiments, the IP addresses of the virtual machines are also supplied to a spoofguard agent (e.g., by a controller) and the spoofguard agent does not need to extract the legitimate IP addresses from one or more initial packets from the virtual machines. A configuration in which the IP addresses are supplied directly to the spoofguard agent is described as a "static" configuration in the description of FIG. 11, below.

II. Spoofguard Agent with DHCP Assigned IPS

The previous section described examples in which the spoofguard agent identified the legitimate IP addresses of virtual machines using static IP addresses. The spoofguard agent then blocked IP packets that used IP addresses other than the legitimate IP addresses. However, some systems use DHCP servers to dynamically set an IP address for a virtual machine.

Figure 7:
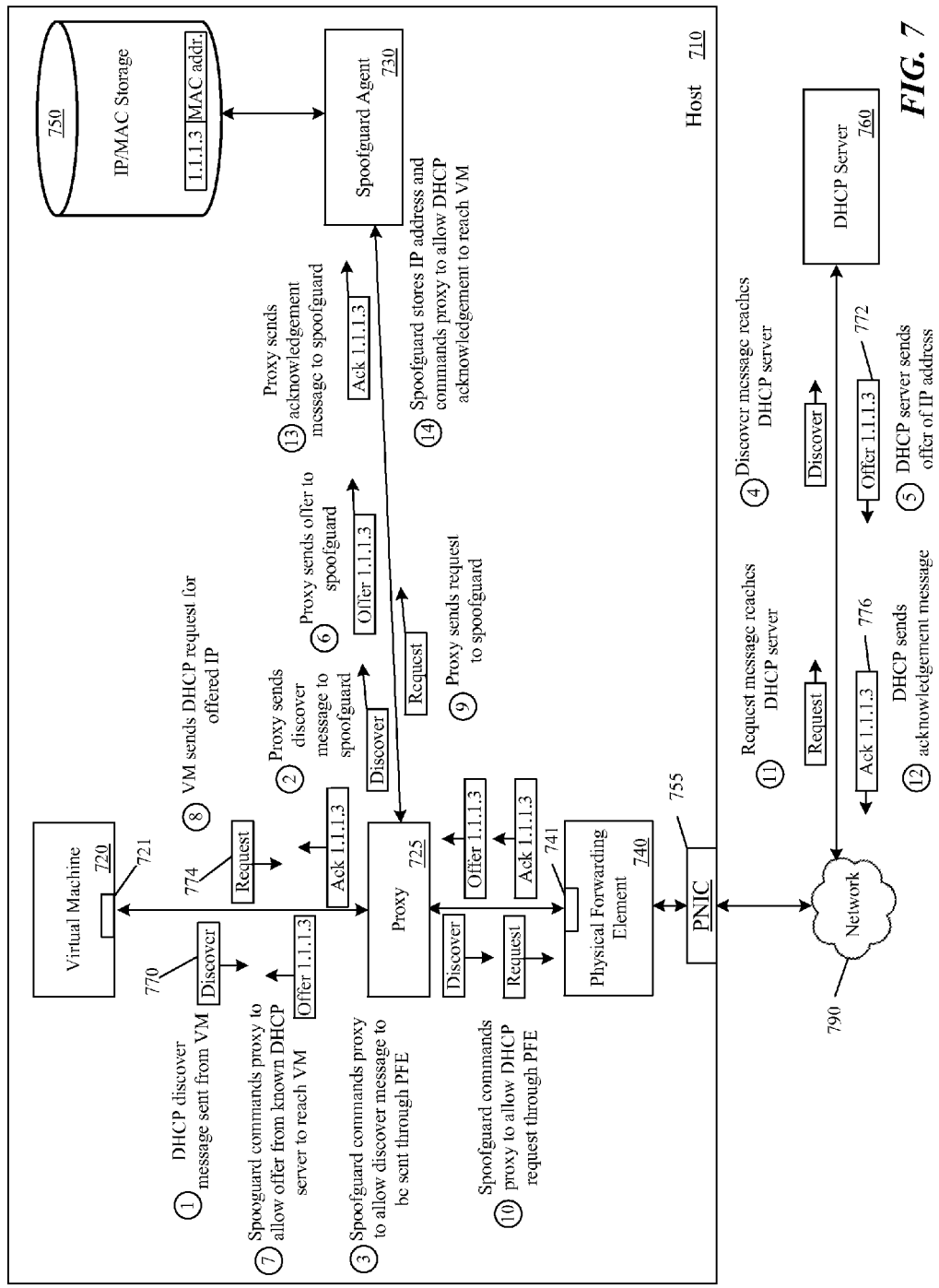
FIG. 7 illustrates the spoofguard agent deducing a source IP address in a dynamic (DHCP allocated) IP address system.

FIG. 7 illustrates the spoofguard agent deducing a source IP address in a dynamic (DHCP allocated) IP address system. The figure includes a host machine 710. The host machine 710 implements a virtual machine 720, a proxy 725, a spoofguard agent 730, and a physical forwarding element 740. The host machine 710 includes IP/MAC address storage 750. The figure also includes a DHCP server 760 accessed through a network 790. Although some elements are omitted from the figure for lack of space, in some embodiments, the host machine 710 implements an agent that configures virtual machines on the host machine 710.

FIG. 7 shows the host machine 710 after the host machine 710 first implements the virtual machine 720. In some embodiments, when the virtual machine 720 is first implemented by the host machine 710 it is assigned a MAC address for a VNIC 721 of the virtual machine 720. In some embodiments, an agent (not shown) supplies the MAC address to the virtual machine and additionally stores the MAC address in the IP/MAC address storage 750. In some embodiments, the spoofguard agent 730 identifies legitimate MAC addresses by accessing the IP/MAC address storage 750. In some such embodiments, the spoofguard agent 730 commands the proxy 725 to block packets with MAC addresses not found in the IP/MAC address storage 750. While this figure does not show the agent that assigns the MAC addresses, in some embodiments, a single agent performs the functions of both an agent that assigns MAC addresses and a spoofguard agent.

After the MAC address is assigned to the VNIC 721 of the virtual machine 720, the virtual machine 720 can begin sending DHCP messages in order to receive an IP address. Messages 770-776 in FIG. 7 illustrate the processing of a DHCP broadcast message. As shown in FIG. 7, the DHCP broadcast process starts when the spoofguard agent 730, through proxy 725, receives a DHCP discover message packet 770 from its VM 720. This message is a broadcast message to any DHCP server on the network 790 (e.g., the logical network that contains the VM, the physical network connecting the hosts to each other and/or other machines, etc.) for DHCP configuration information, including an IP address for the VNIC 721 of the VM 720 and any other information that is part of the DHCP set up. In some embodiments, the requested information (including the IP address) is information that will allow the VM 720 of host 710 to operate with other VMs in a logical network that is defined by the physical forwarding elements (PFEs) that execute on the various hosts, other machines outside the network, etc. In some embodiments, the DHCP configuration data is defined in the address space that is set aside for the logical network to which VM 720 of host 710 belongs.

After receiving the discover message 770, the spoofguard agent 730 determines whether the message is a DHCP discover broadcast message. If not, the spoofguard agent 730 blocks the packet (e.g., by commanding the proxy to block the packet, commanding the PFE 740 to block the packet, etc.). On the other hand, when the spoofguard agent 730 determines that the received packet is a DHCP discover broadcast, the spoofguard agent 730 allows the message packet through the PFE 740 to reach the DHCP server 760 (and in some embodiments, any other DHCP servers available to the virtual machine) through network 790. In some embodiments, the spoofguard agent 730 does not interfere with a discover message 770. In such embodiments, the discover message is broadcast to all available DHCP servers. However, in other embodiments, a spoofguard agent modifies discover messages to convert them into unicast messages that only go to a single DHCP server (or in some embodiments, an agent that performs the functions of a DHCP server). Unicast systems of such embodiments are further described below, after the description of FIG. 10.

In response to the request from the VM 720, the DHCP server 760 sends a DHCP offer message packet 772 to the VM 720. The offer message packet 772 includes an IP address of the DHCP server and an offered IP address for the VNIC 721 of the VM 720. The proxy 725 intercepts this offer in some embodiments and sends the offer 772 (or relevant parts of the offer) to the spoofguard agent 730. The spoofguard agent 730 determines whether the offer 772 is from a legitimate DHCP server (e.g., whether the IP address and/or MAC address of the DHCP server is one of a list of known IP addresses and/or MAC addresses of legitimate DHCP servers). In some embodiments, a controller (e.g., a controller of an enterprise or datacenter that includes the hosts) provides the spoofguard agent with data identifying legitimate DHCP servers. When the offer 772 is from a known DHCP server, the spoofguard agent 730 allows the offer to reach the VM 720 (e.g., by allowing the PFE 740 to forward the offer through the port 741 to VNIC 721 without the offer being blocked by the proxy 725).

After receiving the DHCP offer 772, VM 720 sends a DHCP request broadcast packet 774. In some embodiments, the request 774 is allowed to be broadcast without interference from the spoofguard agent 730 to reach any available DHCP servers. The request packet 774 includes identifying information of the DHCP server that provides the offer that the VM 720 is accepting and a copy of the offered IP address (in this figure, 1.1.1.3). The request informs the DHCP server 774 that its offered IP address is accepted and (because the request 774 is not addressed to the IP/MAC addresses of any other DHCP servers) informs any other DHCP servers available to the VM 720 that their offers are rejected (e.g., so that the other DHCP servers can return their offered IP addresses to the IP address pool). In some embodiments that suppress broadcast DHCP messages, the spoofguard agent 730 converts the broadcast request packet 774 into a unicast request packet addressed to a specific DHCP (or in some embodiments into multiple unicast packets individually addressed to multiple specific DHCPs).

After receiving the DHCP request 774, the DHCP server 760 sends a DHCP acknowledgement packet 776 to the VM 720. The proxy 725 intercepts the DHCP acknowledgement packet 776 and forwards the packet to the spoofguard agent 730. The spoofguard agent 730 then inspects the acknowledgement packet 776. When the spoofguard agent 730 determines that the acknowledgement packet 776 is from a legitimate DHCP server, the spoofguard agent 730 commands the proxy 725 to allow the acknowledgement packet 776 to reach the VM 720. The spoofguard agent 730 also stores the assigned IP address for the VNIC 721 of VM 720 (i.e., the IP address in the acknowledgement packet 776). In some embodiments, the spoofguard agent 730 stores the IP address for the VNIC 721 of VM 720 based on other messages, but replaces the stored address if the address in the acknowledgement packet differs from the previously received addresses (e.g., if the initial DHCP allocation fails and a second set of DHCP messages is sent).

Figure 8:
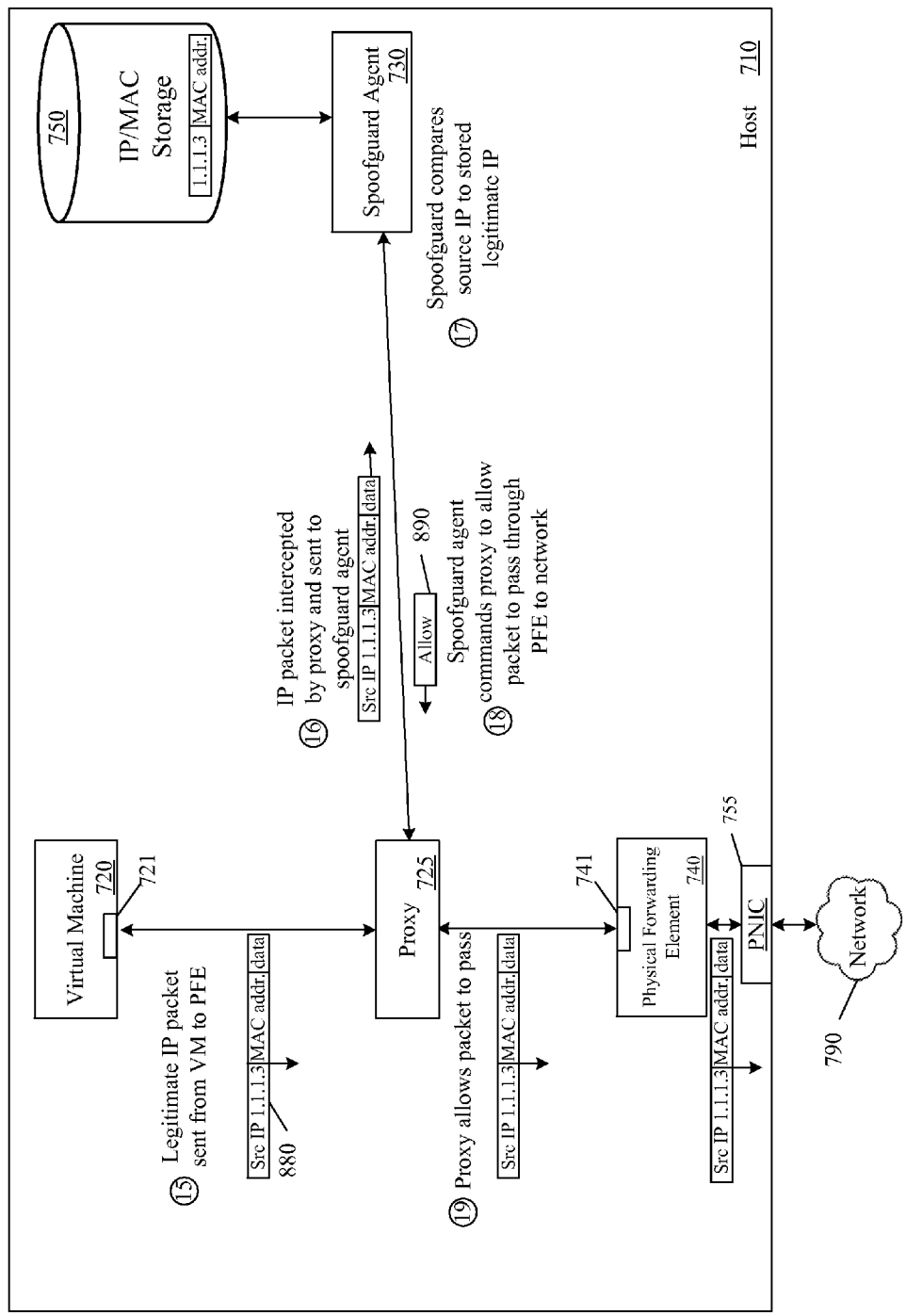
FIG. 8 illustrates the spoofguard agent allowing a legitimate packet to pass through after a DHCP server allocates an IP address to a virtual machine.

Once the VNIC 721 of the virtual machine 720 has been configured with an IP address, the virtual machine 720 can send IP packets using that IP address. The spoofguard agent 730 will allow such packets to pass through the PFE 740. FIG. 8 illustrates the spoofguard agent allowing a legitimate packet to pass through after a DHCP server allocates an IP address to a virtual machine. In FIG. 8, the virtual machine 720 sends an IP packet 880 from VNIC 721 to the port 741 of physical forwarding element 740, through proxy 725. The proxy 725 sends the packet (or relevant parts of the packet) to spoofguard agent 730, which compares the source address of the IP packet 880 to the stored source address (extracted from the response 772) in storage 750. When the source address of the IP packet 880 (here 1.1.1.3) matches the stored source address associated with the MAC address of VNIC 721 (here, 1.1.1.3), the spoofguard agent 730 sends a command 890 to the proxy 725 to allow the physical forwarding element 740 to forward the IP packet 880 (e.g., to a network 790). Upon receiving the command 890, the proxy 725 allows the physical forwarding element 740 to forward the IP packet 880.

Figure 9:
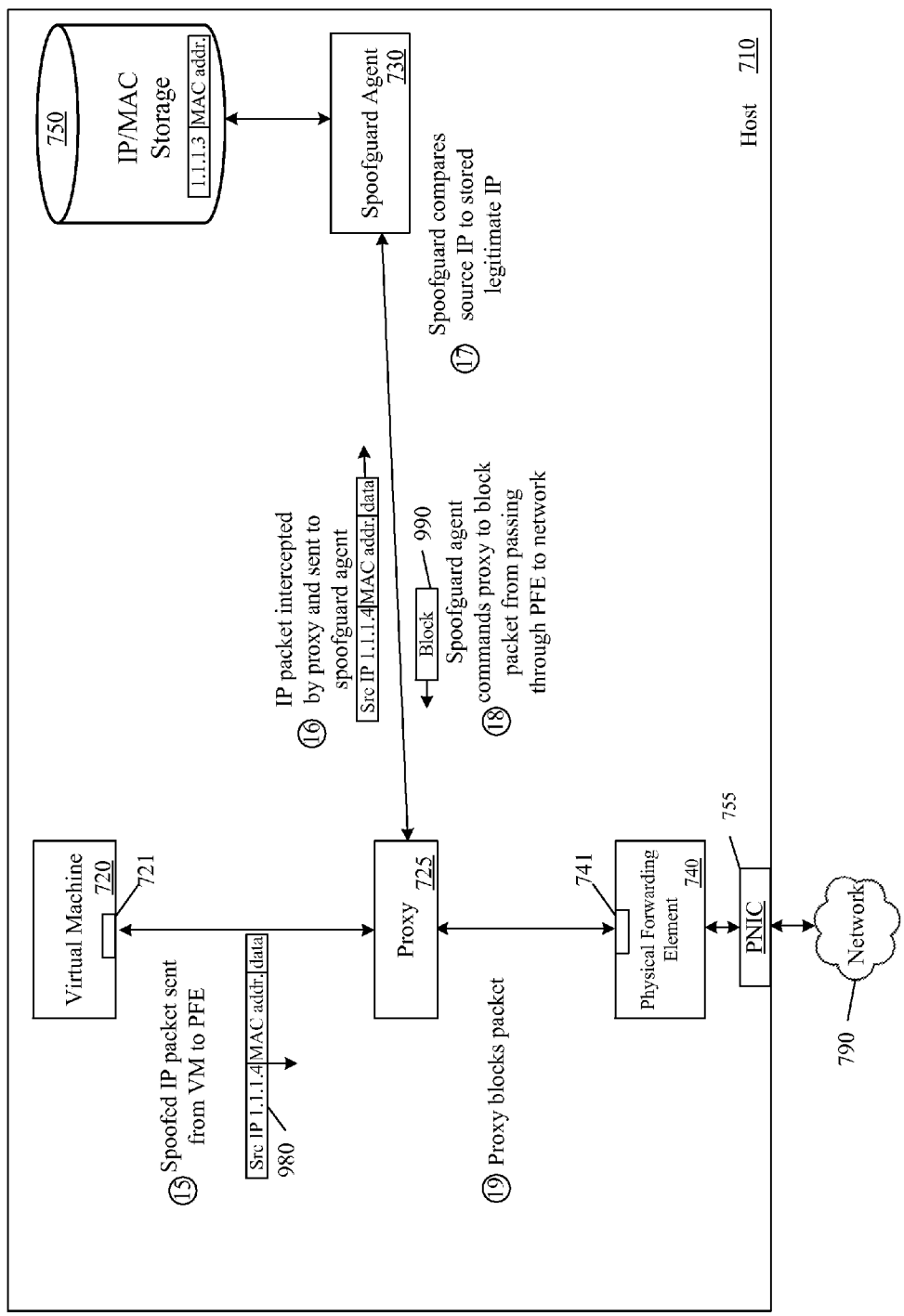
FIG. 9 illustrates a spoofguard agent blocking an illegitimate packet sent after a DHCP server allocates an IP address to a virtual machine.

One of ordinary skill in the art will understand that while FIGS. 7-9 show a single virtual machine on a host, in some embodiments each host implements multiple virtual machines. In some such embodiments, each of multiple virtual machines includes one or more VNICs, each VNIC having a MAC address and an IP address associated with them. Because there are multiple VNICs, each with a different MAC address and legitimate IP address, the spoofguard agents of some embodiments check each outgoing packet to determine whether the source IP address of the packet matches the legitimate source IP address associated with the MAC address of the packet, rather than simply checking whether the source IP address matches any legitimate source IP address of any virtual machine (or VNIC) implemented on the host. That is, a packet with a source IP address that is in the IP/MAC storage, but is associated with a different MAC address than the MAC address of the packet will not be allowed to pass through by the spoofguard agents of some embodiments.

In contrast to FIG. 8, FIG. 9 illustrates a spoofguard agent blocking an illegitimate (spoofed) packet sent after the DHCP server allocates an IP address to the virtual machine 720. In FIG. 9, the virtual machine 720 sends a spoofed IP packet 980 from VNIC 721 to the port 741 of physical forwarding element 740, through the proxy 725. The proxy 725 forwards the packet 980 (or relevant parts of the packet 980) to the spoofguard agent 730, which compares the source address of the spoofed IP packet 980 to the stored source address (extracted from the DHCP response 772 in FIG. 7) in storage 750. When the source address of the spoofed IP packet 980 (here, 1.1.1.4) does not match the stored source address associated with the MAC address of VNIC 721 (here, 1.1.1.3), the spoofguard agent 730 sends a command 990 to the proxy 725 to block the physical forwarding element 740 from forwarding the spoofed IP packet 980. Upon receiving the command 990, the proxy 725 blocks the packet 980.

Figure 10:
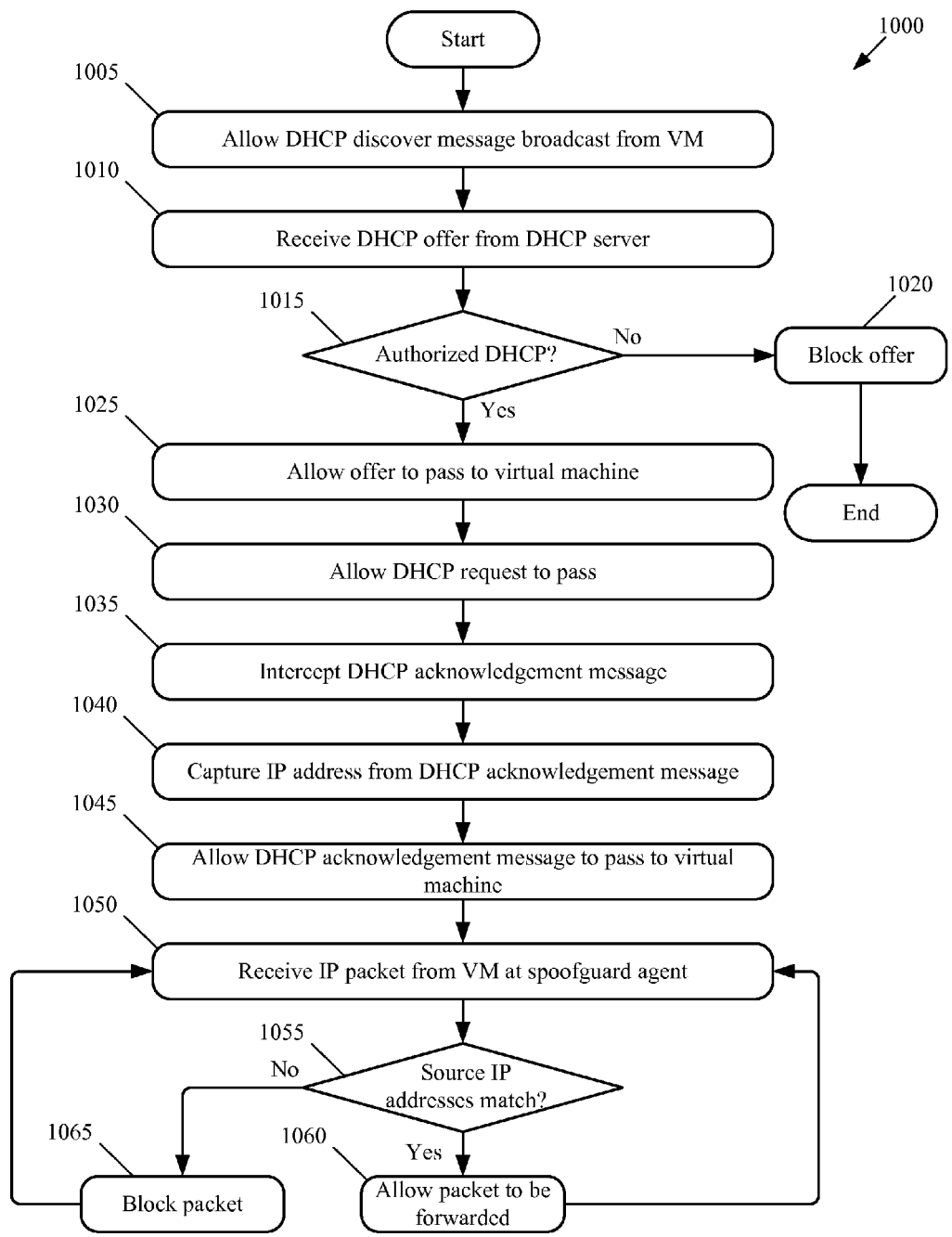
FIG. 10 conceptually illustrates a process of some embodiments for blocking spoofed IP packets and allowing legitimate IP packets in a system with DHCP allocated IP addresses.

The preceding FIGS. 7-9 illustrate examples where the spoofguard agent allows legitimate IP packets to pass through (FIG. 8) and blocks spoofed IP packets (FIG. 9). The spoofguard agent of some embodiments determines whether to block or allow packets using a process as shown in FIG. 10. FIG. 10 conceptually illustrates a process 1000 of some embodiments for blocking spoofed IP packets and allowing legitimate IP packets in a system with DHCP allocated IP addresses. The process 1000 allows (at 1005) a DHCP discover message to be broadcast from a virtual machine (e.g., virtual machine 720 of FIG. 7). The process 1000 receives (at 1010) a DHCP offer with a proposed IP address from a DHCP server (e.g., DHCP server 760 of FIG. 7).

The process then determines (at 1015) whether the DHCP offer is from a legitimate DHCP server (e.g., a DHCP server with an IP address and/or MAC address that are on a list of authorized DHCP server addresses). When the DHCP offer is not from a legitimate DHCP server, the process blocks (at 1020) the DHCP offer and then ends. When the DHCP offer is from an authorized DHCP, the process allows (at 1025) the DHCP offer to pass through to the virtual machine (e.g., to pass through from port 741 of PFE 740, through the proxy 725, to the VNIC 721 of virtual machine 720).

The process 1000 then allows (at 1030) a DHCP request to pass through from the virtual machine to the physical forwarding element. The process then intercepts (at 1035) a DHCP acknowledgement message from the DHCP server to the virtual machine (e.g., message 776 of FIG. 7). The process then captures (at 1040) the IP address assigned to the virtual machine's VNIC by the DHCP server from the DHCP acknowledgement message. In some embodiments, the process stores the IP address for the VNIC of a VM based on other messages (e.g., the offer message), but replaces the stored address if the address in the acknowledgement packet differs from the previously received addresses (e.g., if the initial DHCP allocation fails and a second set of DHCP messages is sent).

The process then allows (at 1045) the DHCP acknowledgement message to reach the virtual machine. After the spoofguard agent stores the allocated IP address, and the virtual machine receives the DHCP acknowledgement message, the process 1000 receives (at 1050) an IP packet from the virtual machine at the spoofguard agent. For example, the IP packet 880 of FIG. 8 is received at spoofguard agent 730 from proxy 725 and spoofed IP packet 980 of FIG. 9 is received at spoofguard agent 730 from proxy 725.

The process 1000 then determines (at 1055) whether the source address of the subsequent IP packet matches the stored source address allocated to the virtual machine by the DHCP server. When the source IP address of the packet matches the allocated IP address, the process 1000 allows (at 1060) the packet to be forwarded by a physical forwarding element of the host machine of the virtual machine. For example, in FIG. 8 the source address of the IP packet 880 (IP address 1.1.1.3) matches the allocated IP address (IP address 1.1.1.3) sent in the DHCP response 772, so the spoofguard agent 730 allows the packet to be forwarded by the physical forwarding element 740 by proxy 725. The process 1000 of some embodiments then returns to operation 1050 to receive another IP packet. In some embodiments, the process ends when the virtual machine is deactivated.

When the source IP address of the IP packet does not match the allocated IP address from the DHCP response, the process 1000 blocks (at 1065) the packet from being forwarded by the physical forwarding element of the host machine of the virtual machine. For example, in FIG. 9 the source address of the spoofed IP packet 980 (IP address 1.1.1.4) does not match the allocated address (IP address 1.1.1.3) of the DCHP response 772, so the spoofguard agent 730 blocks the packet from being forwarded by the physical forwarding element 740. The process 1000 of some embodiments then returns to operation 1050 to receive another IP packet. In some embodiments, the process ends when the virtual machine is deactivated.

The above described process 1000 loops back to operation 1050 to receive another IP packet from the virtual machine without taking other actions. However, in some embodiments, the spoofguard agent sends a report (e.g., to a network administrator) when a virtual machine attempts to send a spoofed packet. In some embodiments, the report is sent after a virtual machine makes a threshold number of attempts to send a spoofed packet.

In the described embodiments of FIGS. 7-10 the hosts use broadcast DHCP discover messages as part of a system for allocating IP addresses. However in other embodiments, a host uses unicast messages to allocate IP addresses. For example, in some embodiments, the spoofguard proxy (or another agent) is used to suppress DHCP broadcast messages while replacing their function in the system. In such embodiments, the proxy (e.g., proxy 725 of FIG. 7) is used (e.g., by the port 741 of the PFE or the VNIC 721 of VM 720 of FIG. 7) to access a spoofguard agent. The spoofguard agent in turn converts the broadcast DHCP discover message into a unicast message addressed to a specific DHCP server (or into multiple unicast messages individually addressed to multiple specific DHCP servers).

In some embodiments, various different systems that provide the functionality of a DHCP server without allowing broadcasts of DHCP discover messages are used. For example, in some embodiments, configuration data is pushed onto DHCP data storage by network controller(s). In other embodiments, an agent on the host pulls the data from the network controller(s) or another entity of an enterprise or datacenter. Either of these two embodiments (pushing data or pulling data) can be implemented in multiple ways. For example, in some embodiments the DHCP storage stores the actual configuration data, in other embodiments, the DHCP storage contains an address for a DHCP server (or an entity substituting for a DHCP server) so that an agent can retrieve DHCP configuration data without multicasting a packet to multiple entities of the network.

Further details of networks that supply DHCP data while suppressing DHCP broadcasts are found in U.S. patent application Ser. No. 14/070,360, filed Nov. 1, 2013, now published as U.S. Patent Publication 2015/0058968, and entitled "Proxy Methods for Suppressing Broadcast Traffic in a Network" and U.S. patent application Ser. No. 14/135, 565, filed Dec. 19, 2013, and entitled "Methods, Apparatuses and Systems for Assigning IP Addresses in a Virtualized Environment", now published as U.S. Patent Publication 2015/0180824, which are hereby incorporated by reference.

III. Multiple IP Identification Methods on One System

Figure 11:
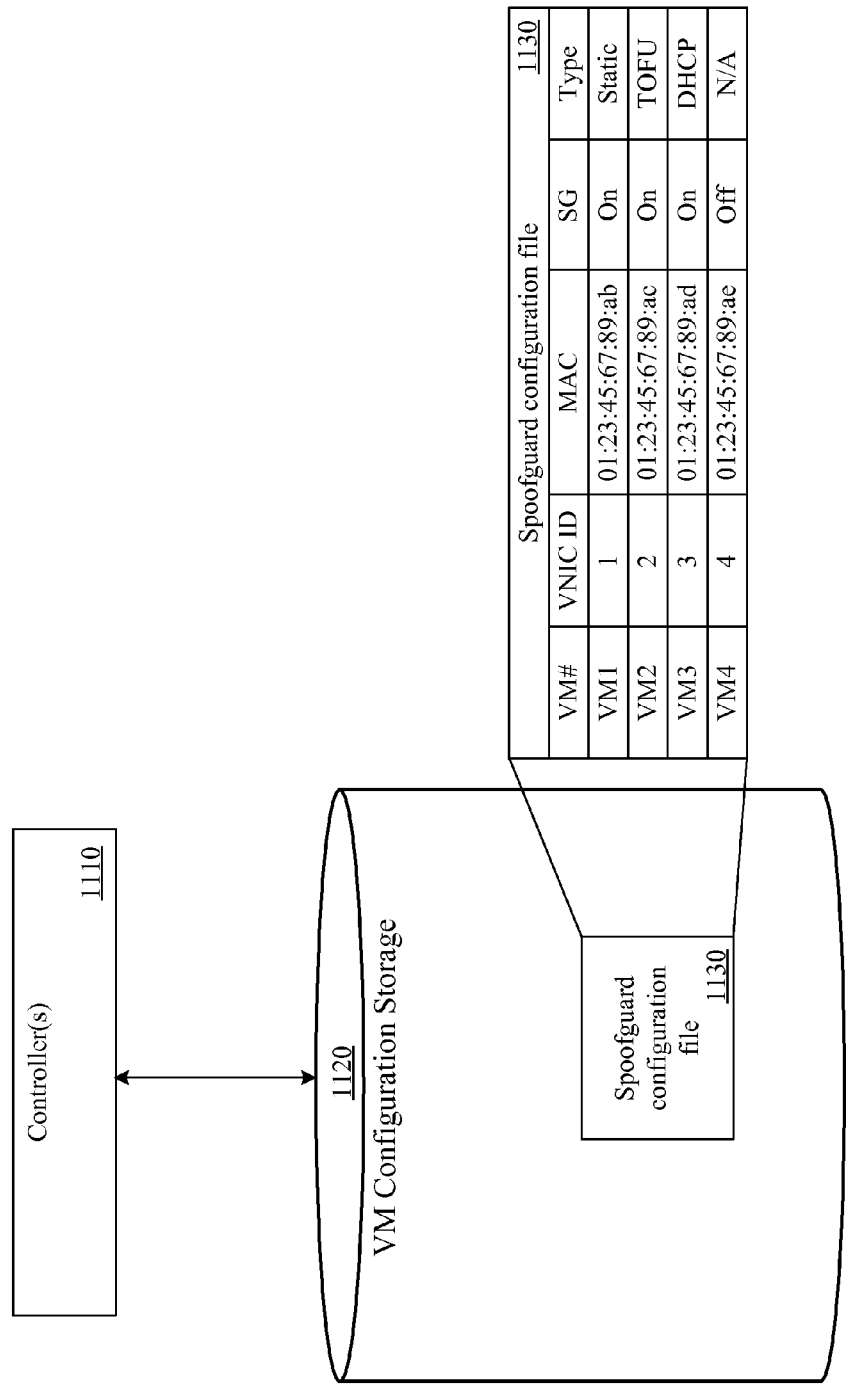
FIG. 11 conceptually illustrates a configuration file for spoofguard agents of some embodiments.

As mentioned above, in some embodiments, the spoofguard agent is configured (e.g., by controller(s)) to work with one or more of 1) virtual machines that are configured to each use a specific IP address, which is to be deduced by the spoofguard agent, 2) virtual machines that are configured to each use a specific IP address, which is supplied to the spoofguard agent by the same system that sets the fixed IP address for the virtual machine, or 3) virtual machines that each use DHCP servers for provisioning. In some embodiments, each virtual machine in a host can be configured to use the spoofguard agent, or not use the spoofguard agent. Furthermore, in some embodiments, the spoofguard agent can be configured to use different IP identification methods with respect to different virtual machines. FIG. 11 conceptually illustrates a configuration file for spoofguard agents of some embodiments. The figure includes controller(s) 1110, virtual machine configuration storage 1120, and spoofguard configuration data 1130. The controller(s) 1110 supply configuration data to the virtual machine configuration storage 1120. The configuration data includes spoofguard configuration data 1130. Although controller(s) 1110 are shown here directly connected to virtual machine configuration storage 1120, in some embodiments, the connection is through one or more entities (e.g., agents) on a host and/or in an enterprise or datacenter outside a host.

The spoofguard configuration data 1130 includes an identifier of the virtual machine to which a data entry applies (here, VM1-VM4), a VNIC ID, a MAC address for the VNIC (in some embodiments, multiple MAC addresses may be supplied for multiple VNICs of a virtual machine), a status of the spoofguard agent for that virtual machine ("on" or "off"), and an IP identification method. Here, one IP identification method is "static", in which the spoofguard agent is configured with the IP address for that specific virtual machine (e.g., supplied with the IP address for a VNIC of the virtual machine, allowed to access storage with that information, etc.). Another IP identification method is "TOFU" (trust on first use), in which the IP addresses are statically allocated to the virtual machine, but the spoofguard agent does not have access to that information. The "TOFU" method was described in detail in section I, above. Briefly, the spoofguard agent (e.g., through a proxy) identifies the IP address of a VNIC of a virtual machine by examining the first IP packet or first set of IP packets that are sent by the virtual machine.

The last IP identification method is "DHCP", in which the virtual machine sends a DHCP discover message to seek an IP address from DHCP servers, as described in section II, above. In some embodiments, in the DHCP method, the spoofguard agent allows DHCP offers and DHCP acknowledgements from an authorized DHCP server, while preventing DHCP offers and/or DHCP acknowledgements from unauthorized DHCP servers. In other embodiments, the spoofguard agent works in conjunction with a DHCP broadcast suppression system that prevents DHCP broadcasts from going out as multicast packets, but replaces the DHCP server functionality with agents that provide configuration data in the same format as a DHCP server. Finally, when the spoofguard agent is turned off for a virtual machine (or a VNIC of the virtual machine) the IP identification method is not applicable (N/A).

As mentioned above, in some embodiments, different virtual machines receive IP addresses using various methods. As described with respect to FIG. 11, some virtual machines are assigned static IP addresses that are directly supplied to a spoofguard agent ("static") configuration, other virtual machines are assigned static IP addresses that are not directly supplied to a spoofguard agent ("trust on first use" (TOFU) configuration), still other virtual machines are assigned IP addresses by DHCP servers ("DHCP" configurations), and finally, some virtual machines do not have their packets examined by the spoofguard agent ("N/A" configurations).

Figure 12:
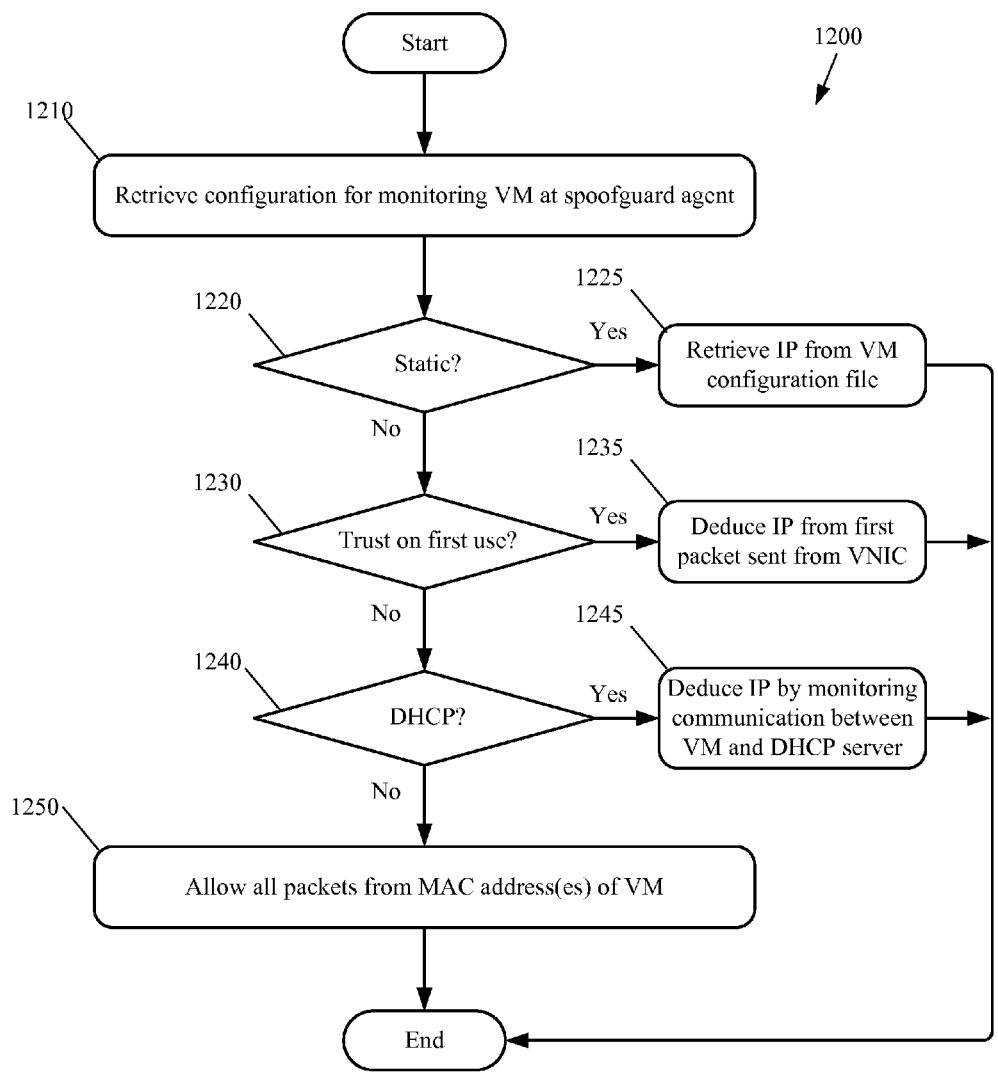
FIG. 12 conceptually illustrates a process of some embodiments for implementing various configurations with a spoofguard agent.

FIG. 12 conceptually illustrates a process 1200 of some embodiments for implementing various configurations with a spoofguard agent. The process 1200 retrieves (at 1210), at a spoofguard agent, a configuration for monitoring a particular VM. The process 1200 determines (at 1220) whether the configuration for that virtual machine indicates a static IP address configuration (i.e., a configuration in which the legitimate IP address is directly supplied to the spoofguard agent). When the configuration is a static IP address configuration, the process 1200 retrieves (at 1225) the IP address directly from the VM configuration file.

When the configuration is not a static IP address configuration, the process 1200 determines (at 1230) whether the configuration is a trust on first use (TOFU) configuration. When the configuration is a TOFU configuration, the process 1200 deduces (at 1235) what the legitimate IP address of the virtual machine is. For example, the process 1200 of some embodiments uses the system described in relation to FIGS. 3-6 to implement a trust on first use configuration.

When the configuration is not TOFU configuration, the process 1200 determines (at 1240) whether the configuration is DHCP configuration (i.e., a configuration in which the virtual machine seeks and receives an IP address from a DHCP server). When the configuration is a DHCP configuration, the process 1200 deduces (at 1245) the legitimate IP address of the virtual machine by monitoring communications between the virtual machine and DHCP servers. For example, the process 1200 of some embodiments uses the system described in relation to FIGS. 7-10 to implement a DHCP configuration.

When the configuration is not a DHCP configuration (or any of the previously determined configurations) the only remaining option in some embodiments is for the spoofguard agent not to monitor the packets of the virtual machine. Therefore, the process 1200 allows (at 1250) all packets from the MAC address(es) of that virtual machine to pass through from the virtual machine to the physical forwarding element without being blocked. The process 1200 then ends.

Some embodiments of the spoofguard agent learn other types of addresses for packets as well as or instead of IP addresses for packets. For example, in some embodiments, the virtual machines broadcast address resolution protocol (ARP) queries and the spoofguard agent identifies addresses from a response to the ARP query.

The description of the previous figures herein references an IP address being assigned to a single VNIC of a virtual machine. In some embodiments, a virtual machine may have two or more VNICs. In such cases separate IP addresses may be assigned to each VNIC of a virtual machine and the spoofguard agent separately learns the IP addresses of each VNIC and associates each IP address with the MAC address assigned to the respective VNICs.

In some of the embodiments described above, the spoofguard agent was characterized as blocking IP packets. However, in various embodiments, the spoofguard agent commands other elements of the system to block IP packets (e.g., a proxy, VNIC, port, virtual machine, or physical forwarding elements). The spoofguard agent is characterized above as both blocking and allowing packets. However, in some embodiments, the default behavior of the physical forwarding element (or the port, VNIC, proxy, etc.) is to block packets unless the spoofguard agent commands that a packet should be allowed to pass through, while in other embodiments, the default behavior of the physical forwarding element (or the port, VNIC, proxy, etc.) is to allow packets to pass through unless the spoofguard agent commands that the packet should be blocked.

The above embodiments are described as being performed by certain modules. However, in some embodiments, multiple actions described as being performed by a single module are actually performed by separate modules. Similarly, some actions described as being performed by multiple modules are performed by a single module in some embodiments.

The embodiments described herein use a spoofguard agent that performs two actions: 1) identifying legitimate source IP addresses associated with VNICs of virtual machine, and 2) blocking IP packets with illegitimate source IP packets. However, in some embodiments, separate modules perform these actions instead of one module performing both. For example, in some embodiments, a learning module identifies the legitimate IP address, while a blocking module blocks the illegitimate IP packets.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
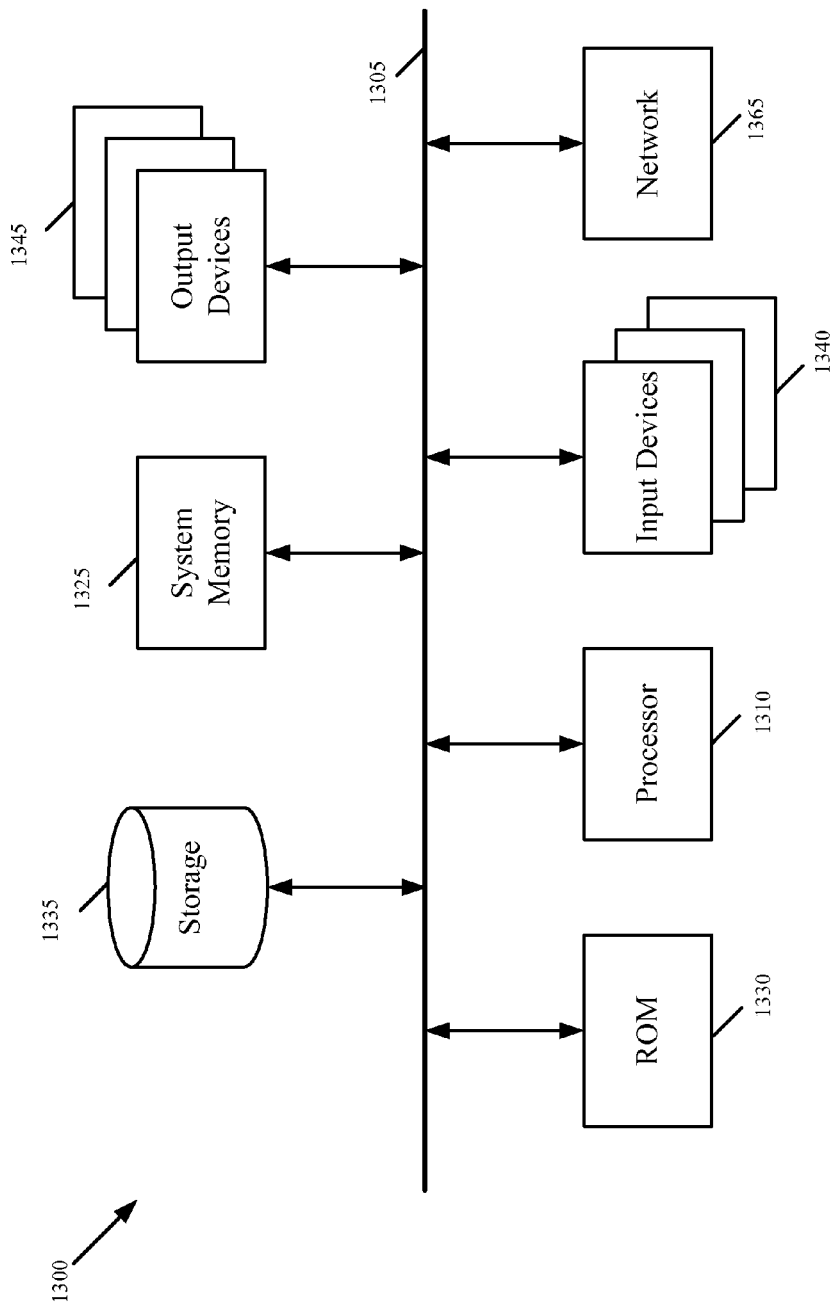
FIG. 13 conceptually illustrates an electronic system with which some embodiments of the invention are implemented.

FIG. 13 conceptually illustrates an electronic system 1300 with which some embodiments of the invention are implemented. The electronic system 1300 can be used to execute any of the control, virtualization, or operating system applications described above. The electronic system 1300 may be a computer (e.g., a desktop computer, personal computer, host machine, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such a random access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "host", "machine", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, FIG. 9 conceptually illustrates a process. The specific operations of the process may not be performed in the exact order shown and described. The specific operations may not be performed in one continuous series of operations, and different specific operations may be performed in different embodiments. Furthermore, the process could be implemented using several sub-processes, or as part of a larger macro process.

Figure 14:
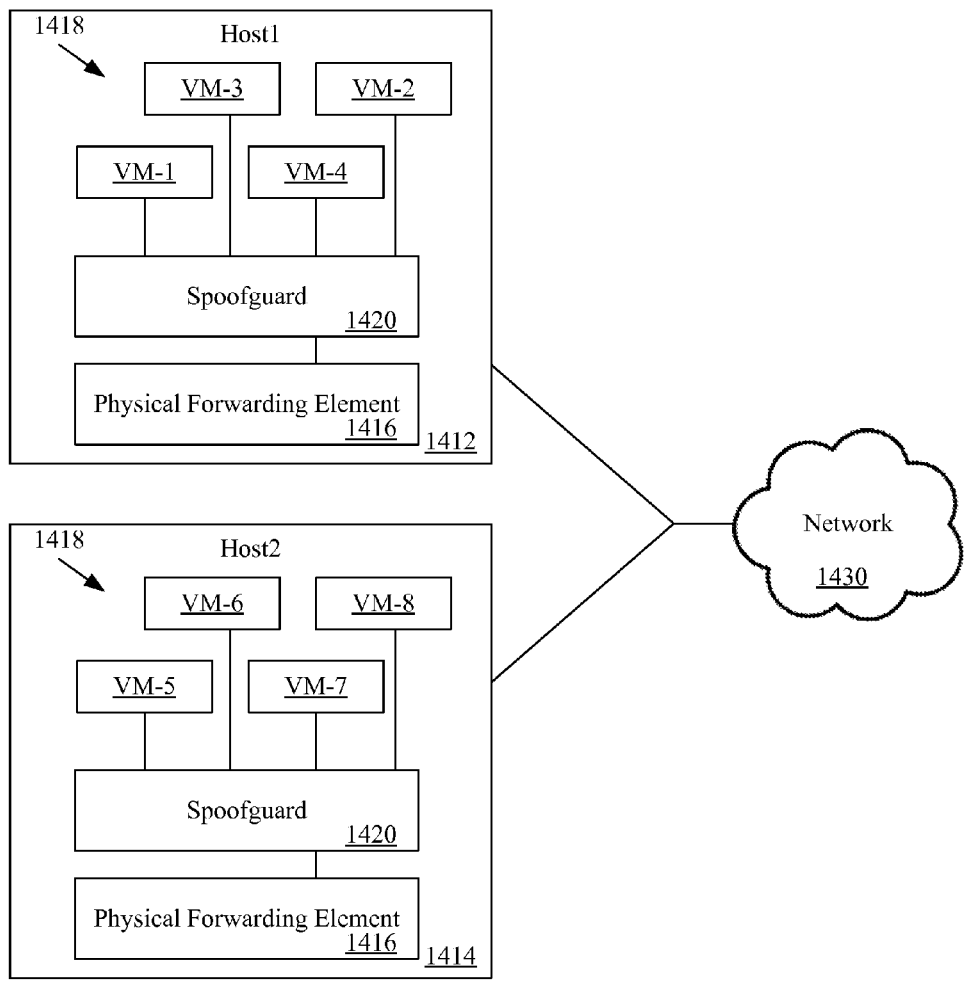
FIG. 14 illustrates an alternative embodiment in which a spoofguard agent is implemented as a layer between the virtual machines and the physical forwarding element.

The above described embodiments use proxies for each virtual machine, with the proxies connecting to a spoofguard agent. However, in other embodiments, the spoofguard agent acts as a layer between the virtual machines and the physical forwarding element. FIG. 14 illustrates an alternate embodiment in which a spoofguard agent is implemented as a layer between the virtual machines and the physical forwarding element of each host. This environment includes host machines (hosts) 1412 and 1414. The hosts 1412 and 1414 are computers that implement physical forwarding elements 1416 (e.g., virtual switches or other software forwarding elements), virtual machines 1418, and spoofguard agents 1420. Traffic between the virtual machines 1418 and the physical forwarding elements 1416 is inspected by the spoofguard agent 1420 before being allowed to pass through the physical forwarding element 1416 in some embodiments. The physical forwarding elements 1416 then pass traffic between virtual machines 1418 and other systems (e.g., other virtual machines on the private network, outside machines, etc.). The hosts 1412 and 1414 connect through a network 1430 (e.g., an L3 network) to other systems (e.g., other hosts or other machines).

As shown in FIG. 14, the host machines 1412 and 1414 host multiple virtual machines 1416. In some cases, the host machines 1412 and 1414 are host machines of a private enterprise, with the virtual machines 1416 belonging to a single tenant, and in other cases, the host machines 1412 and 1414 are hosts of a public datacenter with the virtual machines 1416 belonging to multiple tenants.

What is claimed is:

1. A non-transitory machine readable medium storing a program which, when implemented by at least one processing unit blocks spoofed packets, the program comprising sets of instructions for:
   receiving a first packet with a first source address from a virtual machine;
   storing the first source address of the first packet;
   receiving, from the virtual machine, a second packet with a second source address;
   comparing the first source address to the second source address;
   when the second source address is the same as the first source address, allowing the second packet to be forwarded; and
   when the second source address is not the same as the first source address, blocking the second packet.

2. The non-transitory machine readable medium of claim 1, wherein the program is executed on a same host machine as the virtual machine.

3. The non-transitory machine readable medium of claim 1, wherein the virtual machine is executed on a host machine.

4. The non-transitory machine readable medium of claim 1, wherein the program further comprises a set of instructions for storing a plurality of source IP addresses for a plurality of virtual machines.

5. The non-transitory machine readable medium of claim 1, wherein the first packet is an initial packet received from the virtual machine after the virtual machine is initially implemented.

6. The non-transitory machine readable medium of claim 1, wherein the first packet and the second packet are IP packets.

7. A method of blocking spoofed packets, the method comprising:
   receiving an address allocation message for a virtual machine from an address provisioning server that provisions addresses for virtual machines, wherein the address allocation message comprises a provisioned address;
   determining whether the address allocation message is received from an address provisioning server of a plurality of legitimate address provisioning servers;
   when it is determined that the address allocation message is received from a legitimate provisioning server, storing the provisioned address of the address allocation message;
   forwarding the address allocation message to the virtual machine;
   receiving, from the virtual machine, a packet with a source address;
   comparing the provisioned first source address to the second source address; and
   upon determining that the source address is the same as the provisioned address, allowing the packet to be forwarded.

8. The method of claim 7 further comprising:
   before receiving the address allocation message, receiving an address provisioning query from the virtual machine; and
   forwarding the address provisioning query to the address provisioning server.

9. The method of claim 7, wherein the address provisioning server is a DHCP server.

10. The method of claim 7, wherein the packet is an IP packet.

11. The method of claim 7 further comprising storing a plurality of provisioned IP addresses for a plurality of virtual machines.

12. The method of claim 7, wherein allowing the packet to be forwarded comprises sending the packet to a physical forwarding element of a host machine.

13. The method of claim 7 further comprising upon determining that the source address is not the same as the provisioned address, blocking the packet and generating a report identifying the virtual machine as having sent a packet with a source address that did not match the provisioned address.

14. A non-transitory machine readable medium storing a program which, when implemented by at least one processing unit blocks spoofed packets, the program comprising sets of instructions for:
   receiving an address allocation message for a virtual machine from an address provisioning server that provisions addresses for virtual machines, wherein the address allocation message comprises a provisioned address;
   determining whether the address allocation message is received from an address provisioning server of a plurality of legitimate address provisioning servers;
   when it is determined that the address allocation message is received from a legitimate provisioning server, storing the provisioned address of the address allocation message;
   forwarding the address allocation message to the virtual machine;
   receiving, from the virtual machine, a packet with a source address;
   comparing the provisioned address to the source address;
   when the source address is the same as the provisioned address, allowing the packet to be forwarded; and
   when the source address is not the same as the provisioned address, blocking the packet.

15. The non-transitory machine readable medium of claim 14, wherein the program further comprises sets of instructions for:
   before receiving the address allocation message, receiving an address provisioning query from the virtual machine; and
   forwarding the address provisioning query to the address provisioning server.

16. The non-transitory machine readable medium of claim 14, wherein the address provisioning server is a DHCP server.

17. The non-transitory machine readable medium of claim 14, wherein the packet is an IP packet.

18. The non-transitory machine readable medium of claim 14, wherein the program further comprises a set of instructions for storing a plurality of provisioned IP addresses for a plurality of virtual machines.

19. The non-transitory machine readable medium of claim 14, wherein the set of instructions for allowing the packet to be forwarded comprises a set of instructions for sending the packet to a physical forwarding element of a host machine.

20. The non-transitory machine readable medium of claim 14, wherein the program further comprises a set of instructions for, when the source address is not the same as the provisioned address, generating a report identifying the virtual machine as having sent a packet with a source address that did not match the provisioned address.

* * * * *